US007980944B2

(12) United States Patent
Okada

(10) Patent No.: US 7,980,944 B2
(45) Date of Patent: Jul. 19, 2011

(54) GAMING MACHINE, GAME CONTROL METHOD AND GAME SYSTEM

(75) Inventor: Kazuo Okada, Tokyo (JP)

(73) Assignee: Aruze Gaming America, Inc., Las Vegas, NV (US)

( * ) Notice: Subject to any disclaimer, the term of this patent is extended or adjusted under 35 U.S.C. 154(b) by 702 days.

(21) Appl. No.: 11/398,706

(22) Filed: Apr. 6, 2006

(65) Prior Publication Data

US 2007/0105609 A1 May 10, 2007

(30) Foreign Application Priority Data

Nov. 7, 2005 (JP) ................................. 2005-322314

(51) Int. Cl.
*A63F 13/00* (2006.01)

(52) U.S. Cl. ........................................... 463/20; 463/25

(58) Field of Classification Search .............. 463/20–26, 463/16

See application file for complete search history.

(56) References Cited

U.S. PATENT DOCUMENTS

| | | | |
|---|---|---|---|
| 4,283,709 | A | 8/1981 | Lucero et al. |
| 4,624,459 | A | 11/1986 | Kaufman |
| 4,669,731 | A | 6/1987 | Clarke |
| 4,837,728 | A | 6/1989 | Barrie et al. |
| 4,964,638 | A | 10/1990 | Ishida |
| 5,178,390 | A | 1/1993 | Okada |
| 5,280,909 | A | 1/1994 | Tracy |
| 5,611,730 | A | 3/1997 | Weiss |
| 5,639,088 | A | 6/1997 | Schneider et al. |
| 5,695,402 | A | 12/1997 | Stupak |
| 5,702,303 | A | 12/1997 | Takemoto et al. |
| 5,770,533 | A | 6/1998 | Franchi |
| 5,820,459 | A | 10/1998 | Acres et al. |
| 5,836,817 | A | 11/1998 | Acres et al. |
| 5,910,048 | A | 6/1999 | Feinberg |
| 6,001,016 | A | 12/1999 | Walker et al. |

(Continued)

FOREIGN PATENT DOCUMENTS

DE 37 12 841 A1 11/1988

(Continued)

OTHER PUBLICATIONS

U.S. Appl. No. 11/734,799, filed Apr. 13, 2007, Okada.

(Continued)

*Primary Examiner* — James S McClellan
*Assistant Examiner* — Allen Chan
(74) *Attorney, Agent, or Firm* — Oblon, Spivak, McClelland, Maier & Neustadt, L.L.P.

(57) ABSTRACT

In a gaming machine of the present invention, a processing device executes: a processing reading from a storage device a program for shifting the game state from a without-insurance mode to a with-insurance mode on condition that a specific number of game media have been inserted, and then executing the program; a processing reading from the storage device a program for providing the player with a predetermined profit when a predetermined variable, accumulatively counted every time a game is played after the game state has been shifted to the with-insurance mode, reaches a set value that is an object of comparison with the predetermined variable, and then executing the program; and a processing reading from the storage device a program for shifting the game state from the with-insurance mode to the without-insurance mode when a result of the game in the with-insurance mode satisfies a predetermined condition, and then executing the program.

15 Claims, 24 Drawing Sheets

U.S. PATENT DOCUMENTS

| | | | | |
|---|---|---|---|---|
| 6,003,013 | A | 12/1999 | Boushy et al. | |
| 6,089,980 | A | 7/2000 | Gauselmann | |
| 6,224,482 | B1 | 5/2001 | Bennett | |
| 6,234,896 | B1 | 5/2001 | Walker et al. | |
| 6,244,957 | B1 | 6/2001 | Walker et al. | |
| 6,254,483 | B1 | 7/2001 | Acres | |
| 6,257,981 | B1 | 7/2001 | Acres et al. | |
| 6,270,409 | B1 | 8/2001 | Shuster | |
| 6,273,820 | B1 | 8/2001 | Haste, III | |
| 6,550,765 | B1 * | 4/2003 | Hyodo | 273/121 B |
| 6,869,362 | B2 * | 3/2005 | Walker et al. | 463/25 |
| 6,932,704 | B2 | 8/2005 | Walker et al. | |
| 6,932,707 | B2 | 8/2005 | Duhamel | |
| 2003/0064809 | A1 | 4/2003 | Okada | |
| 2003/0064810 | A1 | 4/2003 | Okada | |
| 2003/0069067 | A1 | 4/2003 | Okada | |
| 2003/0069073 | A1 | 4/2003 | Okada | |
| 2003/0073486 | A1 | 4/2003 | Okada | |
| 2003/0073487 | A1 | 4/2003 | Okada | |
| 2003/0078095 | A1 | 4/2003 | Okada | |
| 2003/0119585 | A1 | 6/2003 | Walker et al. | |
| 2003/0220138 | A1 | 11/2003 | Walker et al. | |
| 2005/0070354 | A1 * | 3/2005 | Baerlocher et al. | 463/20 |
| 2005/0143169 | A1 | 6/2005 | Nguyen et al. | |
| 2005/0164764 | A1 * | 7/2005 | Ghaly | 463/16 |
| 2005/0227756 | A1 * | 10/2005 | Kane et al. | 463/25 |
| 2006/0009276 | A1 | 1/2006 | Okada | |

FOREIGN PATENT DOCUMENTS

| | | | |
|---|---|---|---|
| DE | 41 37 010 | A1 | 8/1992 |
| EP | 0 631 798 | A1 | 1/1995 |
| EP | 1 302 914 | A2 | 4/2003 |
| GB | 2 326 830 | | 1/1999 |
| JP | 9-264777 | | 10/1997 |
| JP | 9-271567 | | 10/1997 |
| JP | 2719450 | | 11/1997 |
| JP | 11-319213 | | 11/1999 |
| JP | 2000-51436 | | 2/2000 |
| JP | 2003-117053 | | 4/2003 |
| WO | WO 2004/095383 | A1 | 11/2004 |
| WO | WO 2005/086778 | A2 | 9/2005 |

OTHER PUBLICATIONS

U.S. Appl. No. 11/734,805, filed Apr. 13, 2007, Okada.
U.S. Appl. No. 11/734,834, filed Apr. 13, 2007, Okada.
U.S. Appl. No. 11/734,810, filed Apr. 13, 2007, Okada.
U.S. Appl. No. 11/735,011, filed Apr. 13, 2007, Okada.
U.S. Appl. No. 11/734,801, filed Apr. 13, 2007, Okada.
U.S. Appl. No. 11/734,815, filed Apr. 13, 2007, Okada.
U.S. Appl. No. 11/734,829, filed Apr. 13, 2007, Okada.
U.S. Appl. No. 11/735,016, filed Apr. 13, 2007, Okada.
U.S. Appl. No. 11/734,989, filed Apr. 13, 2007, Okada.
U.S. Appl. No. 11/734,962, filed Apr. 13, 2007, Okada.
U.S. Appl. No. 11/262,803, filed Nov. 1, 2005, Okada, et al.
U.S. Appl. No. 11/262,780, filed Nov. 1, 2005, Okada.
U.S. Appl. No. 11/262,744, filed Nov. 1, 2005, Okada.
U.S. Appl. No. 11/262,945, filed Nov. 1, 2005, Okada.
U.S. Appl. No. 11/262,743, filed Nov. 1, 2005, Okada, et al.
U.S. Appl. No. 11/262,804, filed Nov. 1, 2005, Okada, et al.
U.S. Appl. No. 11/262,802, filed Nov. 1, 2005, Okada.
U.S. Appl. No. 11/262,742, filed Nov. 1, 2005, Okada.
U.S. Appl. No. 11/262,763, filed Nov. 1, 2005, Okada, et al.
U.S. Appl. No. 11/398,695, filed Apr. 6, 2006, Okada.
U.S. Appl. No. 11/398,663, filed Apr. 6, 2006, Okada.

* cited by examiner

Fig. 3

| | Left reel | Center reel | Right reel |
|---|---|---|---|
| Code No. | Symbol | Symbol | Symbol |
| 00 | JACKPOT 7 | JACKPOT 7 | JACKPOT 7 |
| 01 | PLUM | BELL | CHERRY |
| 02 | ORANGE | APPLE | ORANGE |
| 03 | PLUM | BELL | APPLE |
| 04 | ORANGE | CHERRY | ORANGE |
| 05 | PLUM | ORANGE | PLUM |
| 06 | ORANGE | PLUM | ORANGE |
| 07 | PLUM | CHERRY | PLUM |
| 08 | BLUE 7 | BELL | ORANGE |
| 09 | CHERRY | APPLE | PLUM |
| 10 | ORANGE | BELL | ORANGE |
| 11 | BELL | STRAWBERRY | PLUM |
| 12 | ORANGE | PLUM | BELL |
| 13 | STRAWBERRY | BLUE 7 | STRAWBERRY |
| 14 | BLUE 7 | BELL | BLUE 7 |
| 15 | ORANGE | APPLE | BELL |
| 16 | APPLE | BELL | CHERRY |
| 17 | PLUM | STRAWBERRY | PLUM |
| 18 | ORANGE | PLUM | ORANGE |
| 19 | PLUM | CHERRY | PLUM |
| 20 | BLUE 7 | BELL | ORANGE |
| 21 | CHERRY | APPLE | PLUM |

| Gaming machine identification number | Number of games | Accumulative number of coin-in | Accumulative number of coin-out | Payment balance | Return rate (%) |
|---|---|---|---|---|---|
| 001 | 300 | 15000 | 13500 | -1500 | 90 |
| 002 | 300 | 15000 | 16500 | 1500 | 110 |
| 003 | 600 | 30000 | 22500 | -7500 | 75 |
| ⋮ | ⋮ | ⋮ | ⋮ | ⋮ | ⋮ |

| Set value | Number of coin-out |
|---|---|
| 600 | 500 |

| Set value | Number of coin-out |
|---|---|
| 600 | (− payment balance) × 50%<br>(provided that the number of coin-out = 500 if a payment balance ≧ 0) |

Fig. 12
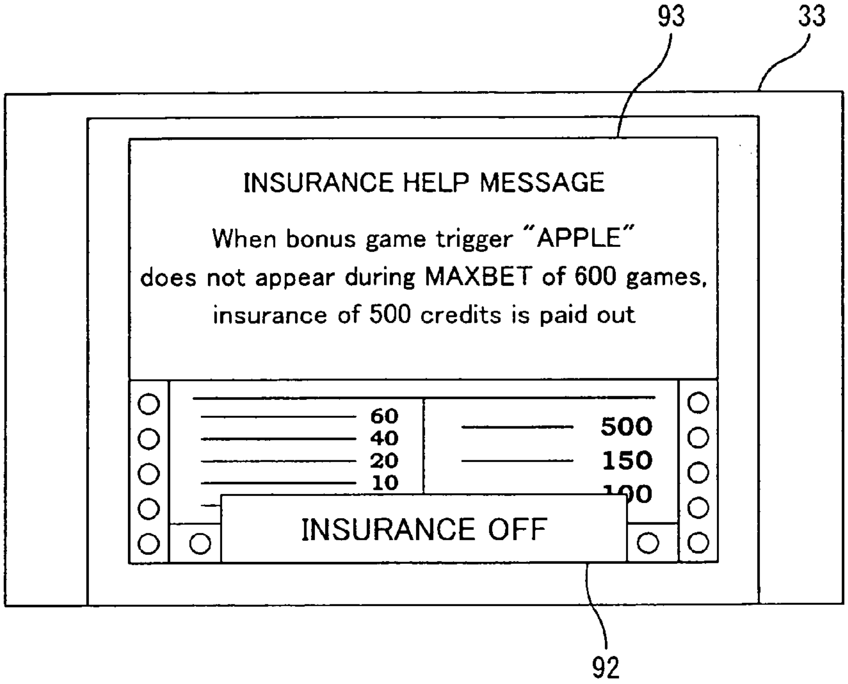
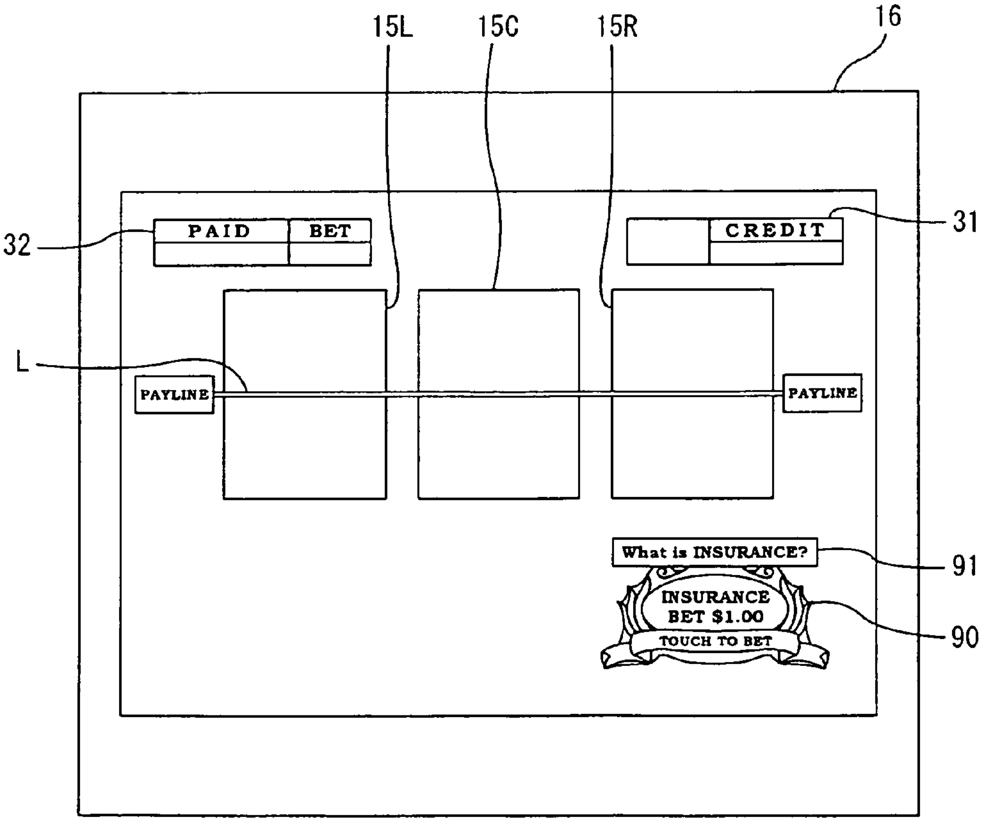

Fig. 17

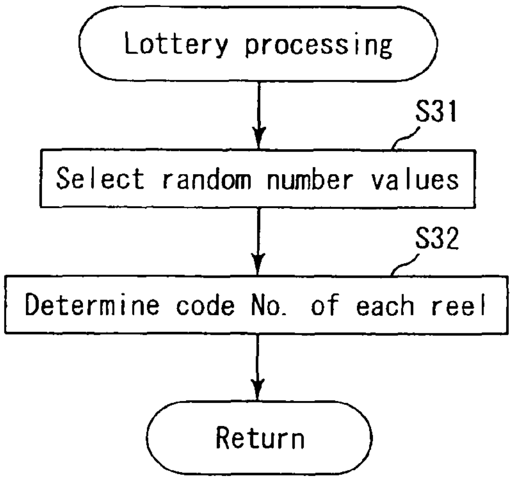

Fig. 18

| Winning combination | | | Establishment possibility (%) | Number of coin-out (※1) |
|---|---|---|---|---|
| Bonus game trigger | | | 0.5 | (※2) |
| JACKPOT 7 | JACKPOT 7 | JACKPOT 7 | 0.5 | 30 |
| BLUE 7 | BLUE 7 | BLUE 7 | 0.8 | 10 |
| BELL | BELL | BELL | 1.1 | 8 |
| CHERRY | CHERRY | CHERRY | 1.5 | 5 |
| STRAWBERRY | STRAWBERRY | STRAWBERRY | 1.5 | 5 |
| PLUM | PLUM | PLUM | 1.8 | 4 |
| ORANGE | ORANGE | ORANGE | 2.3 | 3 |
| CHERRY | CHERRY | (ANY) | 3.0 | 2 |
| ORANGE | ORANGE | (ANY) | 3.0 | 2 |
| CHERRY | (ANY) | (ANY) | 7.5 | 1 |
| ORANGE | (ANY) | (ANY) | 7.5 | 1 |

※1: the number of coin-out per one coin-in
※2: the number of free games determined by lottery is performed

| Code No. | Index | Number of steps (※) |
|---|---|---|
| 00 | | 0 |
| 01 | | 18 |
| 02 | | 36 |
| 03 | | 54 |
| 04 | | 72 |
| 05 | 1 | 91 |
| 06 | | 109 |
| 07 | | 127 |
| 08 | | 145 |
| 09 | | 163 |
| 10 | | 182 |
| 11 | | 200 |
| 12 | | 218 |
| 13 | | 236 |
| 14 | | 254 |
| 15 | | 273 |
| 16 | 2 | 291 |
| 17 | | 309 |
| 18 | | 327 |
| 19 | | 345 |
| 20 | | 364 |
| 21 | | 382 |

※the number of steps with index 1 as a reference (Help image display processing)

Fig. 23
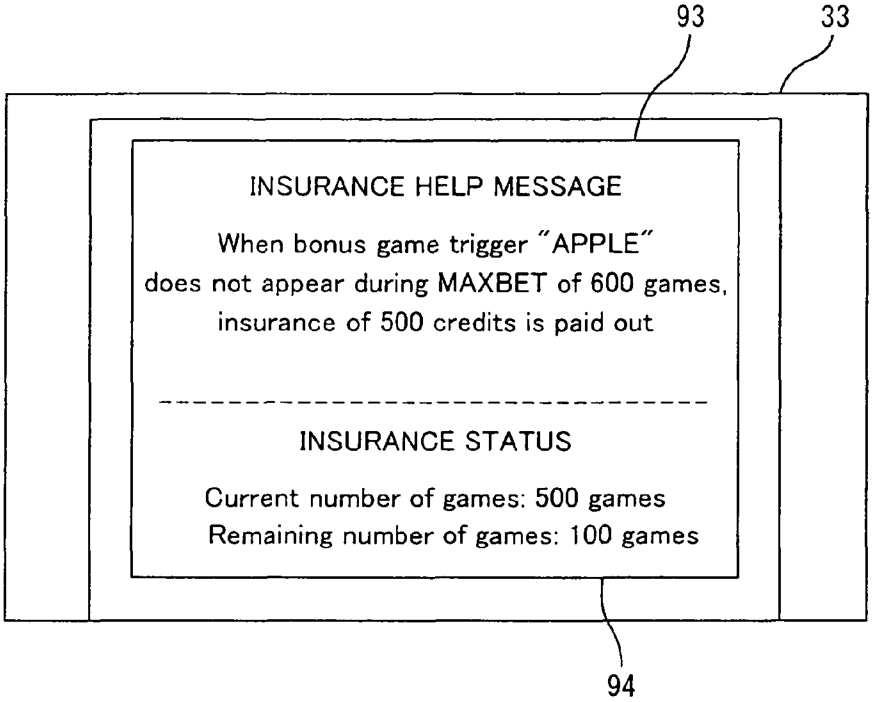
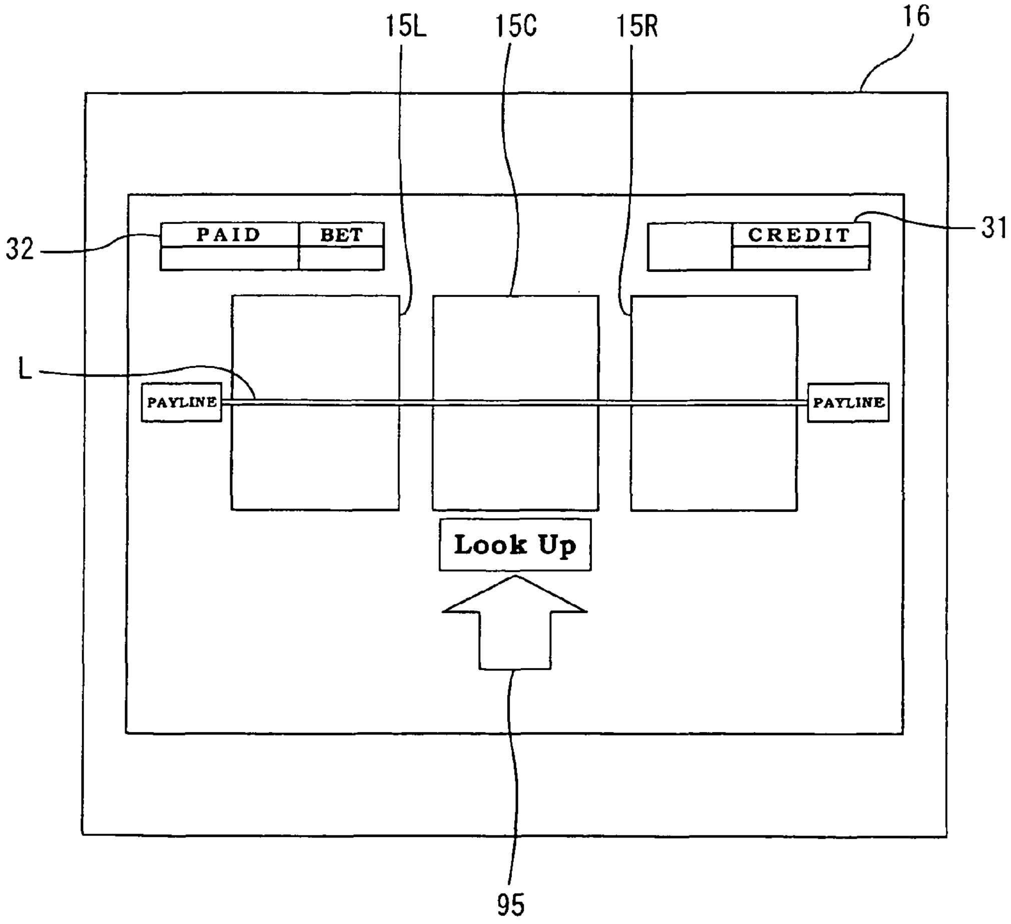

Fig. 28
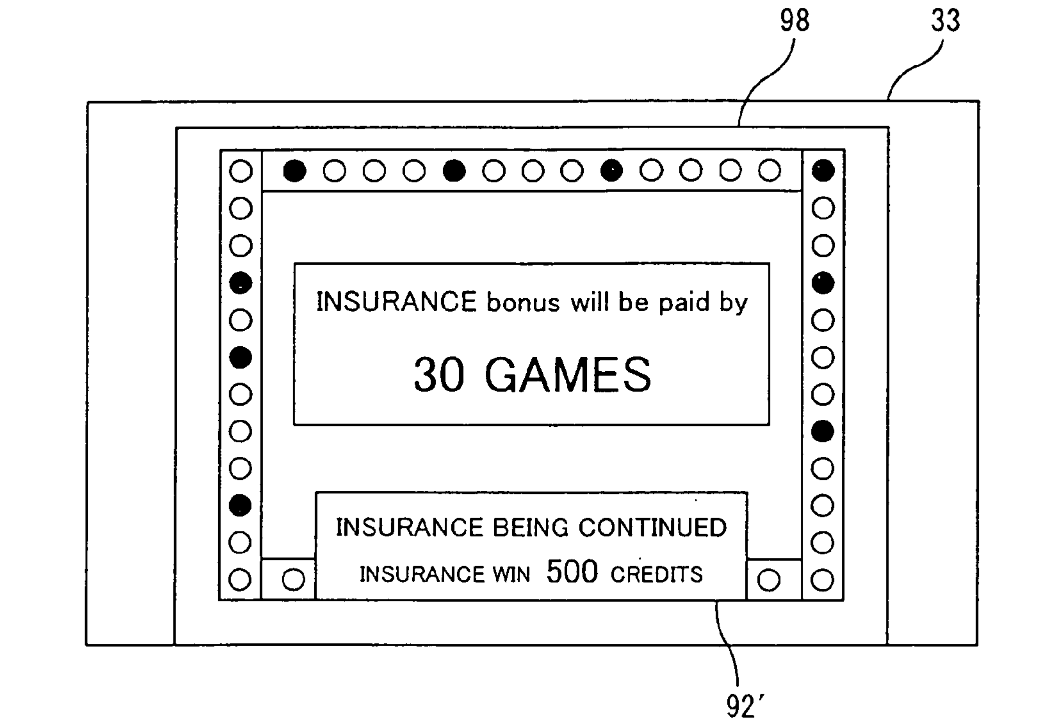
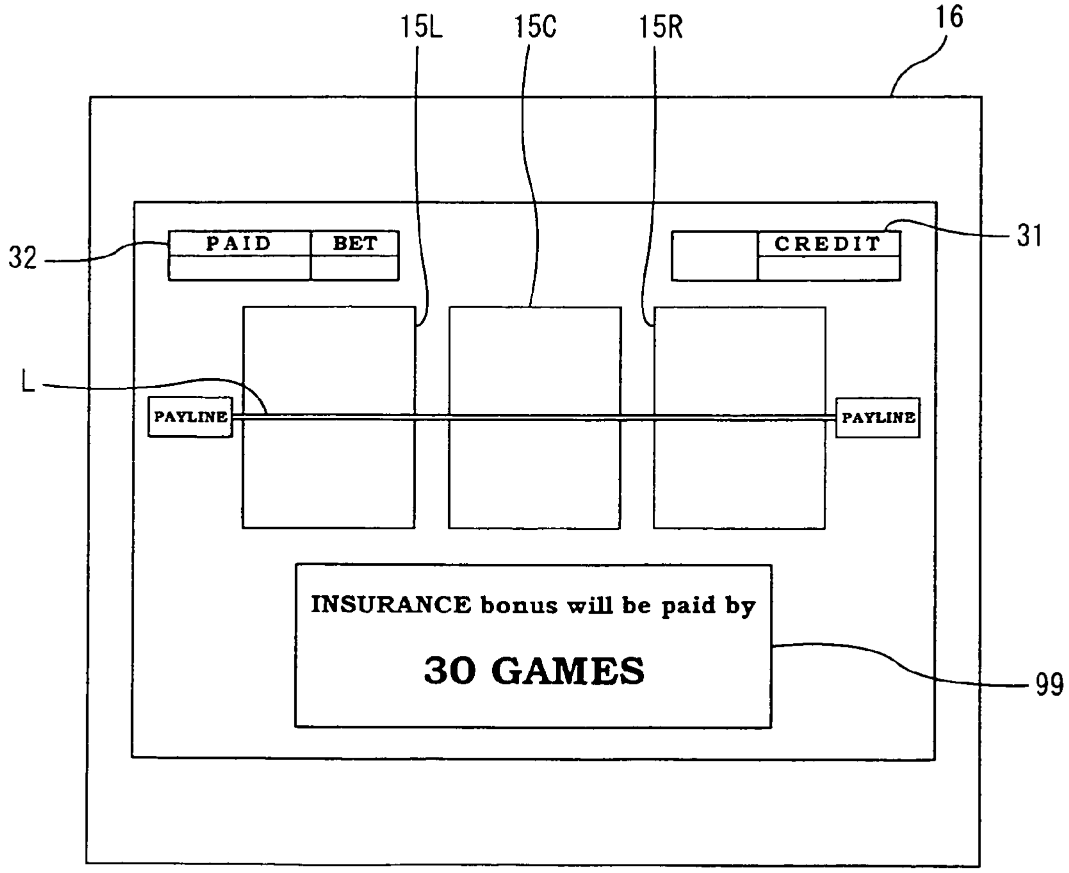

GAMING MACHINE, GAME CONTROL METHOD AND GAME SYSTEM

CROSS-REFERENCE TO RELATED APPLICATIONS

This application claims benefit of priority based on Japanese Patent Application No. 2005-322314 filed on Nov. 7, 2005. The contents of this application are incorporated herein by reference in their entirety.

BACKGROUND OF THE INVENTION

1. Field of the Invention

The present invention relates to a gaming machine such as a slot machine in which a game is conducted using a game media (game valuable) such as a coin and the like, a game control method for the gaming machine, and a game system comprising the gaming machine and a control device.

2. Discussion of the Background

Conventionally, in a facility in which gaming machines such as a slot machine are installed, a game is played by inserting various kinds of game media such as a coin, cash and the like into a gaming machine. Each gaming machine pays out a dividend to a player according to a prize wining state (a result of playing the game) generated while the game is in progress.

In a casino where plural slot machines are installed, a credit spent in each slot machine is partly reserved and in a case where the reservation reaches a predetermined amount, one of the slot machines provides a so-called "jackpot" paying out a big amount, which is not paid out in an ordinary hit (JP-A 2003-117053). In such slot machines, a hit in each machine usually occurs on a preset probability and a player advances a game with expectation of the hit to be encountered. One of the slot machines has a chance to hit a jackpot at a timing in a lottery different from a common lottery in which a hit based on the above-mentioned probability is set in the slot machines. Generally, plural casinos are interconnected in a network in order to increase a payout amount in a jackpot.

Furthermore, a system has been available in which a host computer and plural gaming machines are interconnected on a network and the generating of a bonus in the gaming machines is controlled by the host computer (U.S. Pat. No. 5,820,459). In this system, not only is the number of coins inserted into each gaming machine added up, but part of a total number of inserted coins in the plural gaming machines are separately added up as a bonus pool. The host computer gives a bonus qualification to a gaming machine in which the number of inserted coins reaches a predetermined number. The host computer transmits a command to one gaming machine selected from gaming machines having bonus qualification, when a value of the bonus pool reaches a predetermined threshold value. The gaming machine which received the command is enabled to play a bonus game high in gambling characteristic.

In a slot machine described in JP-A 2003-117053, however, it is a player who plays a game in a gaming machine selected in a lottery that enjoys a profit from a jackpot. Hence, there has arisen a case where a player having spent many coins cannot enjoy a jackpot at all, but another player who has just started the game acquires a jackpot profit.

In the system described in U.S. Pat. No. 5,820,459 as well, a chance to acquire the profit of a bonus game is one of gaming machines in which a total number of inserted coins reaches a predetermined number. A chance to acquire the profit of a bonus game is not always given to a player having spent many coins. Therefore, in the system described in U.S. Pat. No. 5,820,459, there has arisen a case where a player having spent many coins cannot secure the profit of a bonus game and another player who has just started the game acquires a bonus game profit, in a similar way to that in a slot machine described in JP-A 2003-117053.

In the system described in U.S. Pat. No. 5,820,459, part of the number of inserted coins in each of plural gaming machines is added up as a bonus pool. Hence, in a case where an operation rate of the gaming machines in the system is low, a player, who has spent many of coins, has had a possibility not to be rewarded by the profit of a bonus game since the value of the bonus pool does not reaches a predetermined threshold value. Moreover, since the bonus game in the system described in U.S. Pat. No. 5,820,459 is high in gambling characteristic, there has arisen a case where the profit of the bonus game cannot be acquired sufficiently by a player, even when he is given a chance capable of acquiring the profit.

If such circumstances occur, a player who has spent many coins may feel unpleasant against the game, build up distrust thereto, or lose interest in or a concern on the game.

The contents of JP-A 2003-117053 and U.S. Pat. No. 5,820,459 are incorporated herein by reference in their entirety.

SUMMARY OF THE INVENTION

The present invention has been made in light of the above-mentioned problems and it is an object of the present invention to provide: a gaming machine capable of preventing a player who has spent many of the game media such as coins from feeling unpleasant against a game, building up a distrust thereto, or losing interest in or a concern on the game; a game control method related to the gaming machine; and a gaming machine system equipped with the gaming machine and a control device.

In order to solve the above-mentioned problems, the present invention provides the following configuration:

(1) A gaming machine equipped with a processing device and a storage device, wherein the processing device executes:

a processing reading from the storage device a program for shifting the game state from a without-insurance mode to a with-insurance mode on condition that a specific number of game media have been inserted, and then executing the program;

a processing reading from the storage device a program for providing the player with a predetermined profit when a predetermined variable, accumulatively counted every time a game is played after the game state has been shifted to the with-insurance mode, reaches a set value that is an object of comparison with the predetermined variable, and then executing the program; and a processing reading from the storage device a program for shifting the game state from the with-insurance mode to the without-insurance mode when a result of the game in the with-insurance mode satisfies a predetermined condition, and then executing the program.

According to the configuration (1), the game state is shifted from a without-insurance mode to a with-insurance mode on condition that a specific number of game media (for example, coins, credits corresponding to coins) have been inserted. The player is provided with a predetermined profit when a predetermined variable, accumulatively counted every time a game is played after the game state has been shifted to the with-insurance mode, reaches a set value that is an object of comparison with the predetermined variable.

It is therefore possible for the player to shift the game state from the without-insurance mode to the with-insurance mode by inserting a specific number of game media. Furthermore, in the with-insurance mode, even in cases including a case where the player consumes a large number of game media by playing games for a long period of time, if continuously playing games until the predetermined variable reaches the set value, the player can obtain a predetermined profit.

Furthermore, if a result of the game in the with-insurance mode satisfies a predetermined condition, the game state is shifted from the with-insurance mode to the without-insurance mode, preventing the player from obtaining a predetermined profit. Since the condition for continuation of the with-insurance mode has been set as thus described, it is possible to get the player interested in or concerned on obtaining the predetermined profit.

Therefore, it can be prevented for a player who has spent many of the game media from feeling unpleasant against the game, building up distrust thereto, or losing interest in or a concern on the game.

It is to be noted that in the present invention, the predetermined variable is not particularly limited so long as it is being accumulatively counted every time a game is played. Examples of the predetermined variable may include the number of games, a payment balance in terms of the game media, a payout rate of game media, game time and the like.

The present invention provides the following configuration:

(2) A gaming machine equipped with a processing device and a storage device, wherein the processing device executes:

a processing determining one winning combination selected from plural winning combinations determined in advance by executing a lottery program stored in the storage device;

a processing reading from the storage device a program for generating a first special game state that is a game state advantageous to a player when the determined winning combination is a special winning combination, and executing the program;

a processing reading from the storage device a program for shifting the game state from a without-insurance mode to a with-insurance mode on condition that a specific number of game media have been inserted, and then executing the program;

a processing reading from the storage device a program for generating a second special game state that is a game state advantageous to the player and is the same kind of game state as or a different kind of game state from the first special game state when the number of games, accumulatively counted every time a game is played after the game state has been shifted to the with-insurance mode, reaches a set value that is an object of comparison with the number of games, and then executing the program; and a processing reading from the storage device a program for shifting the game state from the with-insurance mode to the without-insurance mode when the winning combination determined in the with-insurance mode is a predetermined winning combination, and then executing the program.

According to the configuration (2), the game state is shifted from a without-insurance mode to a with-insurance mode on condition that a specific number of game media have been inserted. A second special game state is then generated when the number of games, counted every time a game is played after the game state has been shifted to the with-insurance mode, reaches a set value. Furthermore, since a condition has been set for continuation of the with-insurance mode such that, if the winning combination determined in the with-insurance mode is a predetermined winning combination, the game state is shifted from the with-insurance mode to the without-insurance mode so as to prevent generation of the second special game state, it is possible to get the player interested in or concerned on the return mode. Therefore, it can be prevented for a player who has spent many of the game media from feeling unpleasant against the game, building up distrust thereto, or losing interest in or a concern on the game.

The present invention provides the following configuration:

(3) A gaming machine equipped with a processing device and a storage device, and connected through a communication line to a control device which counts the number of games accumulatively for every gaming machine of plural gaming machines, wherein the processing device executes:

a processing determining one winning combination selected from plural winning combinations determined in advance by executing a lottery program stored in the storage device;

a processing reading from the storage device a program for generating a first special game state that is a game state advantageous to a player when the determined winning combination is a special winning combination, and executing the program;

a processing reading from the storage device a program for shifting the game state from a without-insurance mode to a with-insurance mode on condition that a specific number of game media have been inserted, and then executing the program;

a processing transmitting an identification information on a gaming machine stored in the storage device to the control device through the communication line every time a game is played after the game state has been shifted to the with-insurance mode;

a processing receiving a command signal transmitted from the control device when the number of games counted accumulatively by the control device based on the identification information on the gaming machine reaches a set value that is an object of comparison with the number of games;

a processing reading from the storage device, based upon the command signal, a program for generating a second special game state that is a game state advantageous to a player and is the same kind of game state as or a different kind of game state from the first special game state, and then executing the program; and a processing reading from the storage device a program for shifting the game state from the with-insurance mode to the without-insurance mode when the winning combination determined in the with-insurance mode is a predetermined winning combination, and then executing the program.

According to the configuration (3), the game state is shifted from a without-insurance mode to a with-insurance mode on condition that a specific number of game media have been inserted. A second special game state is then generated upon receipt of a command signal transmitted from the control device when the number of games, counted with the control device after the game state has been shifted to the with-insurance mode, reaches a set value. Furthermore, a condition has been set for continuation of the with-insurance mode such that, when a winning combination determined in the with-insurance mode is a predetermined winning combination, the game state is shifted from the with-insurance mode to the without-insurance mode so as to prevent generation of the second special game state, thereby allowing an increase in player's interest in or concern on the second special game state. Therefore, it can be prevented for a player who has spent many of the game media from feeling unpleasant against the game, building up distrust thereto, or losing interest in or concern on the game.

The present invention provides the following configuration:

(4) A gaming machine equipped with a processing device and a storage device, wherein the processing device executes:

a processing determining one winning combination selected from plural winning combinations determined in advance by executing a lottery program stored in the storage device;

a processing reading from the storage device a program for generating a first special game state that is a game state advantageous to a player when the determined winning combination is a special winning combination, and executing the program;

a processing reading from the storage device a program for shifting the game state from a without-insurance mode to a with-insurance mode on condition that a specific number of game media have been inserted, and then executing the program;

a processing counting accumulatively the number of games every time a game is played after the game state has been shifted to the with-insurance mode;

a processing determining whether or not the number of games has reached a set value;

a processing reading from the storage device a program for generating a second special game state that is a game state advantageous to a player and is the same kind of game state as or a different kind of game state from the first special game state, when the number of games is determined to have reached the set value, and then executing the program; and a processing reading from the storage device a program for shifting the game state from the with-insurance mode to the without-insurance mode when the winning combination determined in the with-insurance mode is a predetermined winning combination, and then executing the program.

According to the configuration (4), the game state is shifted from a without-insurance mode to a with-insurance mode on condition that a specific number of game media have been inserted. The number of games is then accumulatively counted every time a game is played after the game state has been shifted to the with-insurance mode. Furthermore, it is determined whether or not the number of games has reached a set value. When the number of games is determined to have reached the set value, a second special game state is generated. Furthermore, a condition has been set for continuation of the with-insurance mode such that, when a winning combination determined in the with-insurance mode is a predetermined winning combination, the game state is shifted from the with-insurance mode to the without-insurance mode so as to prevent generation of the second special game state, thereby allowing an increase in player's interest in or concern on the second special game state. Therefore, it can be prevented for a player who has spent many of the game media from feeling unpleasant against the game, building up distrust thereto, or losing interest in or a concern on the game.

The present invention provides the following configuration:

(5) A gaming machine equipped with a processing device and a storage device, wherein the processing device executes:

a processing determining one winning combination selected from plural winning combinations determined in advance by executing a lottery program stored in the storage device;

a processing reading from the storage device a program for generating a first special game state that is a game state advantageous to a player when the determined winning combination is a special winning combination, and executing the program;

a processing reading from the storage device a program for shifting the game state from a without-insurance mode to a with-insurance mode on condition that a specific number of game media have been inserted, and then executing the program;

a processing reading from the storage device a program for generating a second special game state that is a game state advantageous to the player and is the same kind of game state as or a different kind of game state from the first special game state when the payment balance in terms of the game media, accumulatively counted every time a game is played after the game state has been shifted to the with-insurance mode, becomes equal to or less than a set value that is an object of comparison with the payment balance in terms of the game media, and then executing the program; and a processing reading from the storage device a program for shifting the game state from the with-insurance mode to the without-insurance mode when the winning combination determined in the with-insurance mode is a predetermined winning combination, and then executing the program.

According to the configuration (5), the game state is shifted from a without-insurance mode to a with-insurance mode on condition that a specific number of game media have been inserted. A second special game state is then generated when a payment balance in terms of the game media becomes equal to or less than a set value. Furthermore, a condition has been set for continuation of the with-insurance mode such that, when a winning combination determined in the with-insurance mode is a predetermined winning combination, the game state is shifted from the with-insurance mode to the without-insurance mode so as to prevent generation of the second special game state, thereby allowing an increase in player's interest in or concern on the second special game state. Therefore, it can be prevented for a player who has spent many of the game media from feeling unpleasant against the game, building up distrust thereto, or losing interest in or a concern on the game.

The present invention provides the following configuration:

(6) A gaming machine equipped with a processing device and a storage device, and connected through a communication line to a control device which counts the payment balance in terms of the game media accumulatively for every gaming machine of plural gaming machines, wherein the processing device executes:

a processing determining one winning combination selected from plural winning combinations determined in advance by executing a lottery program stored in the storage device;

a processing reading from the storage device a program for generating a first special game state that is a game state advantageous to a player when the determined winning combination is a special winning combination, and executing the program;

a processing reading from the storage device a program for shifting the game state from a without-insurance mode to a with-insurance mode on condition that a specific number of game media have been inserted, and then executing the program;

a processing transmitting the number of game media inserted and paid out in a game played by a player together with an identification information on a gaming machine, which are stored in the storage device to the control device through the communication line every time a game is played after the game state has been shifted to the with-insurance mode;

a processing receiving a command signal transmitted from the control device when the payment balance in terms of the game media counted accumulatively by the control device, based on the identification information on the gaming machine and the number of game media inserted and paid out in a game played by a player, is equal to or less than a set value that is an object of comparison with the payment balance in terms of the game media;

a processing reading from the storage device, based upon the command signal, a program for generating a second special game state that is a game state advantageous to a player and is the same kind of game state as or a different kind of game state from the first special game state, and then executing the program; and a processing reading from the storage device a program for shifting the game state from the with-insurance mode to the without-insurance mode when the winning combination determined in the with-insurance mode is a predetermined winning combination, and then executing the program.

According to the configuration (6), the game state is shifted from a without-insurance mode to a with-insurance mode on condition that a specific number of game media have been inserted. A second special game state is then generated upon receipt of a command signal transmitted from the control device when a payment balance in terms of the game media, counted with the control device after the game state has been shifted to the with-insurance mode, becomes equal to or less than a set value. Furthermore, a condition has been set for continuation of the with-insurance mode such that, when a winning combination determined in the with-insurance mode is a predetermined winning combination, the game state is shifted from the with-insurance mode to the without-insurance mode so as to prevent generation of the second special game state, thereby allowing an increase in player's interest in or concern on the second special game state. Therefore, it can be prevented for a player who has spent many of the game media from feeling unpleasant against the game, building up distrust thereto, or losing interest in or a concern on the game.

The present invention provides the following configuration:

(7) A gaming machine equipped with a processing device and a storage device, wherein the processing device executes:

a processing determining one winning combination selected from plural winning combinations determined in advance by executing a lottery program stored in the storage device;

a processing reading from the storage device a program for generating a first special game state that is a game state advantageous to a player when the determined winning combination is a special winning combination, and executing the program;

a processing reading from the storage device a program for shifting the game state from a without-insurance mode to a with-insurance mode on condition that a specific number of game media have been inserted, and then executing the program;

a processing counting accumulatively the payment balance in terms of the game media every time a game is played after the game state has been shifted to the with-insurance mode;

a processing determining whether or not the payment balance in terms of the game media is equal to or less than a set value;

a processing reading from the storage device a program for generating a second special game state that is a game state advantageous to a player and is the same kind of game state as or a different kind of game state from the first special game state, when the payment balance in terms of the game media is determined to be equal to or less than the set value, and then executing the program; and a processing reading from the storage device a program for shifting the game state from the with-insurance mode to the without-insurance mode when the winning combination determined in the with-insurance mode is a predetermined winning combination, and then executing the program.

According to the configuration (7), the game state is shifted from a without-insurance mode to a with-insurance mode on condition that a specific number of game media have been inserted. A payment balance in terms of the game media is then accumulatively counted every time a game is played after the game state has been shifted to the with-insurance mode. Furthermore, it is determined whether or not the payment balance in terms of game media has become equal to or less than a set value. When the payment balance in terms of the game media is determined to have become equal to or less than the set value, a second special game state is generated. Furthermore, a condition has been set for continuation of the with-insurance mode such that, when a winning combination determined in the with-insurance mode is a predetermined winning combination, the game state is shifted from the with-insurance mode to the without-insurance mode so as to prevent generation of the second special game state, thereby allowing an increase in player's interest in or concern on the second special game state. Therefore, it can be prevented for a player who has spent many of the game media from feeling unpleasant against the game, building up distrust thereto, or losing interest in or a concern on the game.

The present invention provides the following configuration:

(8) The gaming machine according to any one of the configurations (2) to (7), wherein the predetermined winning combination is the special winning combination.

According to the configuration (8), when the winning combination determined in the with-insurance mode is the predetermined winning combination, the game state is shifted from the with-insurance mode to the without-insurance mode. The second special game state thus cannot be generated, but the first special game state is generated based upon the special winning combination. As mentioned above, the shift of the game state to the with-insurance mode is certainly followed by generation of the first special game state or the second special game state. Therefore, it can be prevented for a player who has spent many of the game media from feeling unpleasant against the game, building up distrust thereto, or losing interest in or a concern on the game.

The present invention provides the following configuration:

(9) A game control method comprising the steps of:

shifting the game state from a without-insurance mode to a with-insurance mode on condition that a specific number of game media have been inserted;

providing the player with a predetermined profit when a predetermined variable, accumulatively counted every time a game is played after the game state has been shifted to the with-insurance mode, reaches a set value that is an object of comparison with the predetermined variable; and shifting the game state from the with-insurance mode to the without-insurance mode when a result of the game in the with-insurance mode satisfies a predetermined condition.

According to the configuration (9), the game state is shifted from a without-insurance mode to a with-insurance mode on condition that a specific number of game media have been inserted. The player is then provided with a predetermined profit when a predetermined variable counted after transition to the with-insurance mode reaches a set value. Furthermore, a condition has been set for continuation of the with-insurance mode such that, when a result of the game in the with-insurance mode satisfies a predetermined condition, the game state is shifted from the with-insurance mode to the without-insurance mode so as to prevent the player from obtaining a predetermined profit, thereby allowing an increase in player's interest or concern on enjoyment of the predetermined profit. Therefore, it can be prevented for a player who has spent many of the game media from feeling unpleasant against the game, building up distrust thereto, or losing interest in or a concern on the game.

The present invention provides the following configuration:

(10) A game system comprising:

a gaming machine equipped with a processing device and a storage device; and a control device connected with the gaming machine through a communication line, wherein the processing device executes:

a processing reading from the storage device a program for shifting the game state from a without-insurance mode to a with-insurance mode on condition that a specific number of game media have been inserted, and then executing the program;

a processing reading from the storage device a program for providing the player with a predetermined profit upon receipt of a predetermined signal from the control device, and then executing the program; and a processing reading from the storage device a program for shifting the game state from the with-insurance mode to the without-insurance mode when a result of the game in the with-insurance mode satisfies a predetermined condition, and then executing the program, and the control device executes:

a processing accumulatively counting a predetermined variable in the gaming machine every time a game is played after the game state has been shifted to the with-insurance mode; and a processing transmitting the predetermined signal to the gaming machine when the predetermined variable reaches a set value that is an object of comparison with the predetermined variable.

According to the configuration (10), the game state is shifted from a without-insurance mode to a with-insurance mode on condition that a specific number of game media have been inserted. The player is then provided with a predetermined profit when a predetermined variable counted after transition to the with-insurance mode reaches a set value. Furthermore, a condition has been set for continuation of the with-insurance mode such that, when a result of the game in the with-insurance mode satisfies a predetermined condition, the game state is shifted from the with-insurance mode to the without-insurance mode so as to prevent the player from obtaining a predetermined profit, thereby allowing an increase in player's interest or concern on enjoyment of the predetermined profit. Therefore, it can be prevented for a player who has spent many of the game media from feeling unpleasant against the game, building up distrust thereto, or losing interest in or a concern on the game.

As a result, according to the present invention, it can be prevented for a player who has spent many of the game media from feeling unpleasant against the game, building up distrust thereto, or losing interest in or a concern on the game.

BRIEF DESCRIPTION OF THE DRAWINGS

FIG. 3 is a schematic view showing the symbol sequence depicted on the outer circumferential surface of each reel;

FIG. 12 is a figure showing one example of images displayed on the upper image display panel and the lower image display panel in the without-insurance mode;

FIG. 17 is a flowchart showing a subroutine of a lottery processing;

FIG. 18 is a figure describing a relationship among winning combinations of plural kinds, establishment possibility of each winning combination and the number of coin-out in the present embodiment;

FIG. 23 is a figure showing one example of images displayed on the upper image display panel and the lower image display panel in the with-insurance mode;

FIG. 28 is a figure showing one example of images displayed on the upper image display panel and the lower image display panel when 30 games are left to be played before the game state is shifted to the return mode.

DESCRIPTION OF THE EMBODIMENTS

Figure 1:
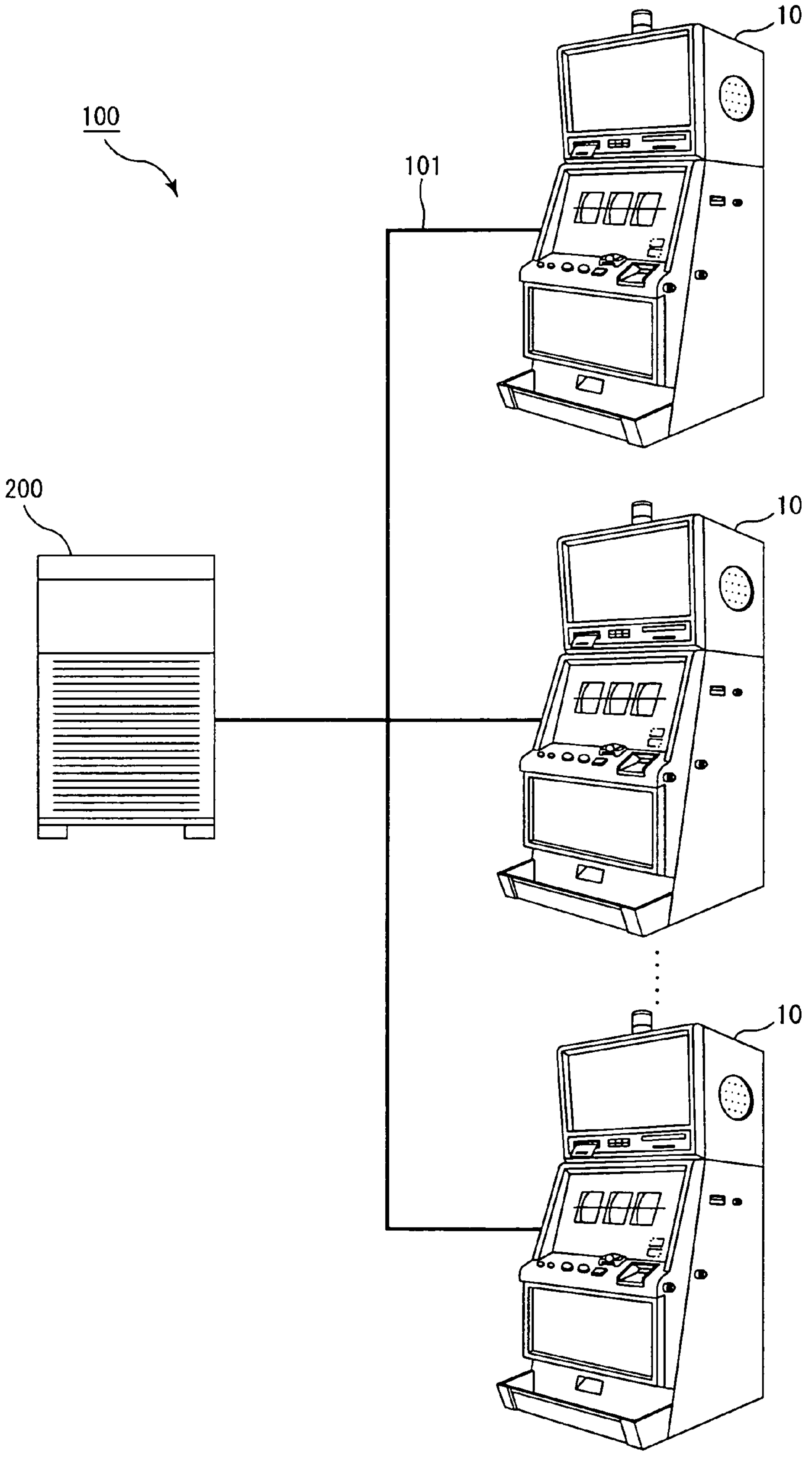
FIG. 1 is a schematic diagram showing the entire construction of a game system according to one embodiment of the present invention.

FIG. 1 is a schematic diagram showing the entire construction of a game system according to one embodiment of the present invention.

A game system 100 includes: plural gaming machines 10; and a control device 200 connected to the gaming machines 10 through a predetermined communication line 101. Such a game system 100 may be constructed in one recreation facility capable of playing various kinds of games such as a bar, a casino and the like, or between plural recreation facilities. When the game system is constructed in one recreation facility, the game system 100 may be constructed on each floor or section of the recreation facility. The communication line 101 is not particularly limited, and may be wired or wireless, and either a dedicated line or a switched line can be used.

In the embodiment, the gaming machine 10 is a slot machine. In the present invention, however, a gaming machine is not limited to a slot machine, and for example, a so-called single gaming machine such as a video slot machine, a video card gaming machine and the like may be adopted, and a so-called mass game (multi-terminal gaming machine) such as a racing game, a bingo game, a public lottery and the like, which is a game that takes a predetermined time for a result to be displayed, may also be adopted.

In the gaming machine 10, a coin, a note or an electronic valuable information corresponding thereto is used as a game media. In the present invention, however, the game media is not particularly limited, and for example, a medal, a token, an electronic money and a ticket can be used. The ticket is not particularly limited and may include, for example, a ticket with a bar code as described later, and of the like tickets.

The control device 200 controls a plurality of gaming machines 10. Particularly in the present embodiment, the control device 200 controls shift to a return mode in each of the gaming machines 10. The return mode corresponds to a second special game state in the present invention. In the return mode, a specific number of coins are paid out or a specific number of credits are added. It is to be noted that the control device 200 may control the shift to the return mode so as to control a return rate. In such a case, the control device 200 may individually control a return rate of each of the gaming machines 10 or may control a return rate over all the gaming machines 10. Furthermore, in the present invention, a later described ticket 39 with a bar code (see FIG. 2) may be issued when the second special game state is generated (when the game state is shifted to the return mode).

The control device 200 may further function as a so-called hole server which is installed in a recreation facility having plural gaming machines 10, or as a server which collectively controls plural recreation facilities. Moreover, every gaming machine 10 has its own identification number, and the source of data transmitted to the control device 200 from each of the gaming machines 10 is distinguished therein by their identification numbers. The identification number is also used to designate a transmission destination of data transmitted to the gaming machine 10 from the control device 200.

The identification number of a gaming machine corresponds to the identification information on a gaming machine of the present invention. The identification information on a gaming machine of the present invention is not particularly limited, and examples thereof may include: a letter, a symbol, a figure, a combination thereof, and the like.

Figure 2:
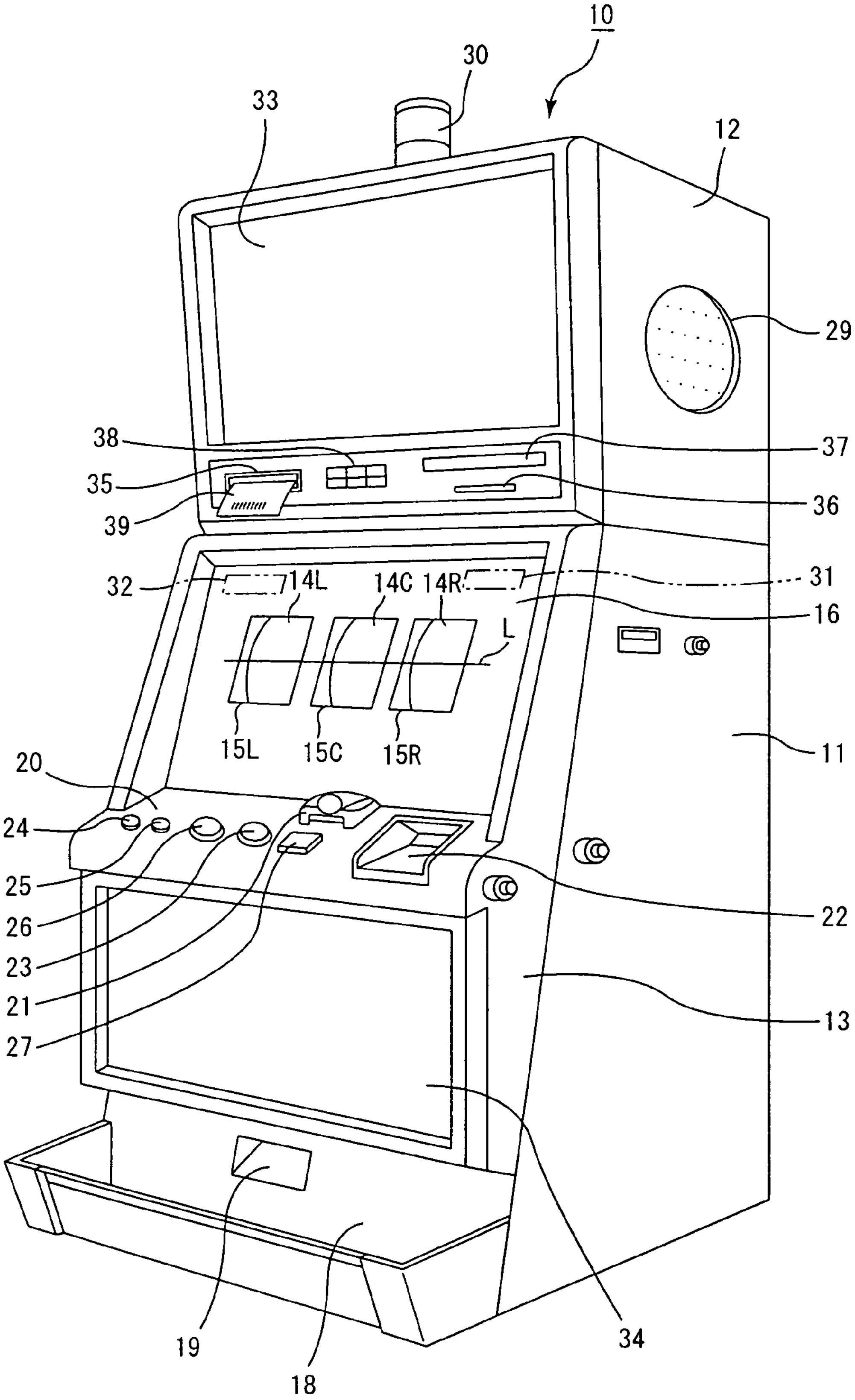
FIG. 2 is a perspective view schematically showing a gaming machine according to one embodiment of the present invention.

FIG. 2 is a perspective view schematically showing a gaming machine according to one embodiment of the present invention.

The gaming machine 10 includes: a cabinet 11; a top box 12 placed on the upper side of the cabinet 11; and a main door 13 provided at the front face of the cabinet 11. Inside the cabinet 11, three reels 14 (14L, 14C and 14R) are rotatably installed. Twenty two designs (hereinafter, also referred to as symbols) are depicted as symbol sequences on the outer circumferential surface of each of the reels 14.

A lower image display panel 16 is provided over the reels 14 in the main door 13. The lower image display panel 16 is provided with a transparent liquid crystal panel, and various kinds of information, representation image and the like associated with the game are displayed while the game is played.

A number-of-credits display section 31 and a number-of-payouts display section 32 are formed on the lower image display panel 16. The number of credited coins is displayed as an image on the number-of-credits display section 31. The number of coins to be paid out is shown as an image on the number-of-payouts display section 32, when a combination of symbols stop displayed on a winning line L is a predetermined combination.

Three display windows 15 (15L, 15C and 15R), the back faces of which are visually recognizable, are formed on the lower image display panel 16, and through each of the display windows 15, three of the symbols depicted on the outer circumferential surface of each of the reels 14 are displayed. One winning line L traversing horizontally the three display windows 15 is formed on the lower image display panel 16. The winning line L defines a combination of symbols. When a combination of symbols stop displayed on the winning line L is a predetermined combination, the number of coins corresponding to the combination and the number of inserted coins (the number of BETs) is paid out.

Moreover, in the present invention, for example, when: plural winning lines L which traverse horizontally or obliquely the three display windows 15 are formed; the winning lines L, the number thereof which becomes effective set to be dependent on the number of coin-in, become effective; and a combination of symbols stop displayed on the winning line L which became effective is a predetermined combination, the number of coins corresponding to the stop-displayed combination may be paid out.

A touch panel 69, which is not shown in the figure, is provided on the front face of the lower image display panel 16 and the player can input various kinds of commands (for example, command on the with-insurance mode) by operating the touch panel 69.

Provided below the lower image display panel 16 are: a control panel 20 constituting of plural buttons 23 to 27 which are input by the player, commands associated with progress of the game; a coin receiving slot 21 accepting coins into the cabinet 11; and a note identifier 22.

The control panel 20 is provided with: a spin button 23; a change button 24; a CASHOUT button 25; a 1-BET button 26; and a maximum BET button 27. The spin button 23 is used for inputting a command to start the rotating of the reels 14. The change button 24 is used in a case where a player requests an attendant of a recreation facility to exchange money. The CASHOUT button 25 is used for inputting a command to pay out credited coins to a coin tray 18.

The 1-BET button 26 is used for inputting a command to bet one coin of the credited coins. The maximum BET button 27 is used for inputting a command to bet the maximum number of coins that can be bet on one game (50 coins in the present embodiment) of the credited coins.

It is to be noted that in the present invention, insertion of the game media means consumption of the game media. The case of consuming the game media includes the case of betting the game media on a game as well as the case of consuming the game media so as to shift the game state to a later described with-insurance mode. For example, when coins inserted into the coin receiving slot 21 are directly bet on a game, insertion of coins into the coin receiving slot 21 corresponds to insertion of a game media. However, when coins inserted into the coin receiving slot 21 are temporarily credited, and the credited coins are bet on a game by operating the 1-BET button 26 or the maximum BET button 27, as in the present embodiment, the bet of the credited coins on the game corresponds to insertion of a game media.

The note identifier 22 is used not only for discriminating a false note from a true note but also for accepting the true note into the cabinet 11. The note identifier 22 may be configured such that a ticket 39 with a bar code which will be described later can be read. A belly glass 34 on which characters and the like of the gaming machine 10 are depicted is provided on the front face of the lower portion of the main door 13, that is, below the control panel 20.

An upper image display panel 33 is provided on the front face of the top box 12. The upper image display panel 33 comprises a liquid crystal panel, which displays, for example, an representation image, introduction of game contents, and explanation of a game rule.

A speaker 29 is provided in the top box 12. A ticket printer 35, a card reader 36, a data display 37 and a key pad 38 are provided beneath the upper image display panel 33. The ticket printer 35 prints on a ticket a bar code in which data such as the number of credits, date, time, identification number of the gaming machine 10 and of the like data are encoded, and outputs the ticket 39 with a bar code. A player can make the ticket 39 with a bar code to be read by a second gaming machine and play a game in the second gaming machine, or exchange in a predetermined place (for example, at a cashier in the casino) of a recreation facility the ticket 39 with a bar code to notes.

The card reader 36 is used for reading data from a smart card and writing data onto a smart card. The smart card is a card to be carried by a player, and for example, data to identify a player and data concerning a history of a game played by a player are stored thereon. Data corresponding to a coin, a note or a credit may also be stored on the smart card. As an alternative of a smart card, a magnetic stripe card may be adopted. The data display 37 is a fluorescent display and the like, and it is used, for example, to display data read by the card reader 36 and data input by a player from the key pad 38. The key pad 38 is used for inputting a command or data to issue a ticket and the like.

FIG. 3 is a schematic view showing the symbol sequence depicted on the outer circumferential surface of each reel.

Twenty two symbols each are depicted on the outer circumferential surface of the left reel 14L, the middle reel 14 C and the right reel 14 R. A sequence of the symbols depicted on the outer circumferential surface of each of the reels 14 is different from one another. The sequences of the symbols are combinations of the following symbols: "JACKPOT 7", "BLUE 7", "BELL", "CHERRY", "STRAWBERRY", "PLUM", "ORANGE" and "APPLE".

When the same three symbols of one of the symbols of "JACKPOT 7", "BLUE 7", "BELL", "CHERRY", "STRAWBERRY", "PLUM" and "ORANGE" are stop displayed on the winning line L, a predetermined number of credits is added to the account of the player as a credit owned by the player (see FIG. 18). As for "CHERRY" and "ORANGE", even if one or two of one of the symbols are stop displayed, a predetermined number of credits are added to the account of the player as credits owned by the player according to the number of the symbols stop displayed (see FIG. 18).

The symbol sequence "APPLE" is a bonus game trigger (a symbol to transit to a bonus game). When three of the "APPLE" are stop displayed on the winning line L, a game state shifts to a bonus game. The bonus game corresponds to the first special game state. The bonus game trigger corresponds to the special winning combination.

In the present embodiment, a bonus game is a free game (a game in which a predetermined number thereof can be played without inserting coins for BET).

In the present invention, the first special game state is not particularly limited as far as it is a game state advantageous to the player. A game state that is advantageous to the player is not particularly limited as far as it is more advantageous than an ordinary game state (a game state other than the first special game state or the second special game state) and examples thereof include: a state where more of the game media can be earned than in an ordinary game state, a state where the game media can be earned on a probability higher than in an ordinary game state, a state where the number of the game media spent by a player is less than in an ordinary game state and of the like state. More specifically, examples of the first special game state include a free game, a second game, a mystery bonus and the like.

The sequence of symbols depicted on each of the reels 14 are, when the spin button 23 is pressed after the 1-BET button 26 or the maximum BET button 27 is pressed to start a game, scroll displayed by scrolling downwards in the display windows 15 during the rotating of the reels 14, and after a predetermined time elapses, the rotating of the reels 14 comes to a stop, and thus the sequence of symbols are stop displayed in the display windows 15. Various kinds of winning combinations (see FIG. 18) are predetermined based on combinations of symbols and when a combination of symbols corresponding to a winning combination stops on the winning line L, the number of payout coins corresponding to the winning combination is added to credits owned by the player. When a bonus game trigger has been established, a bonus game is generated.

When a return mode flag which will be described later has been set to the state "ON", a game state shifts to a return mode after the symbols are stop displayed as described above. When a bonus game has been generated, the game state shifts to the return mode after the bonus game is over. The return mode corresponds to the second special game state. In the present embodiment, when the game state is shifted to the return mode, a specific number of coins are paid out, or a specific number of credits are added. It should be noted that in the present invention, the ticket 39 with a bar code where predetermined information is printed may be issued upon generation of the second special game state (when the game state shifts to the return mode).

In the present invention, the second special game state is not particularly limited as far as it is a game state advantageous to the player. Examples of such a game state include: a state where more of the game media can be earned than in an ordinary game state, a state where the game media can be earned on a probability higher than in an ordinary game state, a state where the number of the game media spent by a player is less than in an ordinary game state and of the like state. More specifically, examples of the second game state include a free game, a second game, a mystery bonus game and the like.

In the present invention, the second special game state may be a game state of the same kind as the first special game state, or a game state of a kind different from the first game state as in the present embodiment. When the second special game state is made to be a game state different from the first special game state, games can be high in versatility, which can enhance a sense of expectation for the second special game state. Moreover, a game state of the second special game state may be an exclusive game state generated only when the second special game state occurs. In such a situation, a sense of expectation for the second special game state can be further enhanced.

Figure 4:
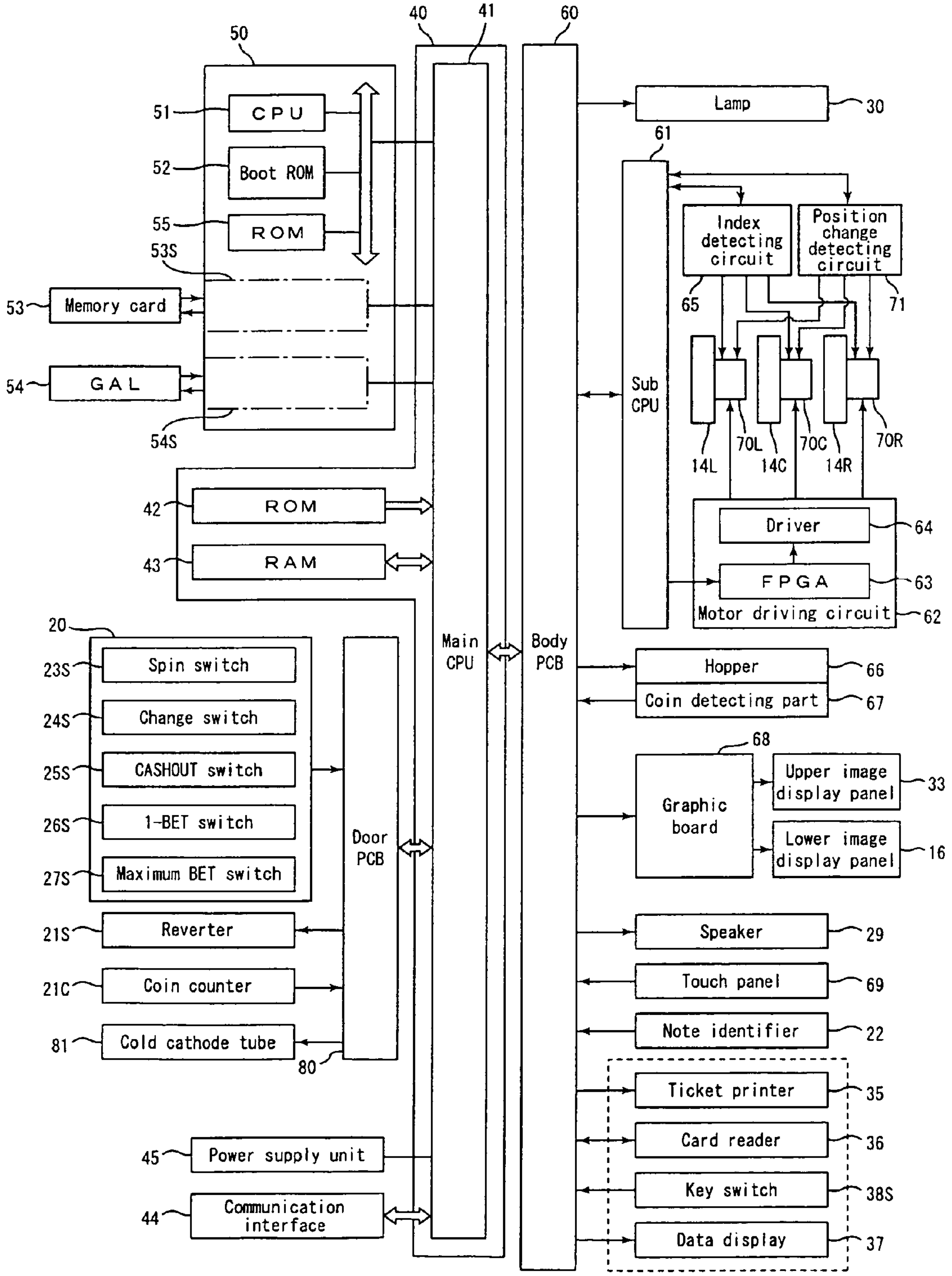
FIG. 4 is a block diagram showing the internal construction of the gaming machine shown in FIG. 2.

FIG. 4 is a block diagram showing the internal construction of the gaming machine shown in FIG. 2.

A gaming board 50 includes: CPU (Central Processing Unit) 51, ROM 55 and boot ROM 52 which are interconnected to one another by an internal bus; a card slot 53S which accepts a memory card 53; an IC socket 54S which accepts GAL (Generic Array Logic) 54.

The memory card 53 is constituted of non-volatile memories such as Compact Flash (registered trademark) and stores a game program and a game system program. The game program contains a lottery program. The lottery program is a program for determining symbols (code Nos. corresponding to the symbols) on each of the reels 14 which are to be stop displayed on the winning line L. The lottery program contains one or more of symbol weighting determination data, each corresponding to respective plural kinds of payout rates (for example, 80%, 84% and 88%). The symbol weighting determination data is data showing a correspondence relationship between a code No. (see FIG. 3) of each symbol and one or plural random number values from a predetermined numerical value range (0 to 255), for each of the three reels 14. A payout rate is determined based on data for setting a payout rate output from the GAL 54, and the lottery is executed based on symbol weighting determination data corresponding to the payout rate.

The card slot 53S is configured so that the memory card 53 can be inserted therein or drawn out therefrom, and connected to a mother board 40 through IDE bus. Therefore, a kind or contents of a game played in the gaming machine 10 can be changed by drawing out the memory card 53 from the card slot 53S, writing a different game program and game system program thereon, and inserting the memory card 53 into the card slot 53S thereafter. Moreover, a kind or contents of a game played in the gaming machine 10 can also be changed by changing a memory card 53 on which a game program and a game system program are stored to a different memory card 53 on which a different game program and game system program are stored. The game program includes a program related to progress in a game; a program for generating the first special game state; and a program for generating the second special game state. The game program further includes: image data and sound data output while a game is played and image data and sound data for notifying that the game state has been shifted to the with-insurance mode.

GAL 54 is one kind of PLD having an OR fixed array structure. GAL 54 is equipped with a plurality of an input port and an output port and when a predetermined data is input to the input port, data corresponding to the input data is output from the output port. The data output from the output port is the above-mentioned data for setting a payout rate.

The IC socket 54S is configured such that GAL 54 can be mounted thereto or demounted therefrom, and connected to the mother board 40 through PCI bus. Therefore, data for setting a payout rate output from GAL 54 can be changed by drawing out GAL 54 from the IC socket 54S, rewriting a program stored on GAL 54, mounting GAL 54 to the IC socket 54S thereafter. Moreover, data for setting a payout rate can also be changed by changing GAL 54 to a different GAL 54.

CPU 51, ROM 55 and boot ROM 52 interconnected to each other by the internal bus are connected to the mother board 40 by PCI bus. The PCI bus not only conducts signal transmission between the mother board 40 and the gaming board 50, but also supplies electric power to the gaming board 50 from the mother board 40. ROM 55 stores country identification information and an authentication program therein. Boot ROM 52 stores a preliminary authentication program, a program for CPU 51 to activate the preliminary authentication program (a boot code) and the like therein.

The authentication program is a program to authenticate a game program and a game system program (an alteration check program). The authentication program is stated along a procedure for confirmation and certification that the game program and the game system program that are objects of an authentication capture processing are not altered, that is, a procedure for conducting authentication of the game program and the game system program (an authentication procedure). The preliminary authentication program is a program for authenticating the above-mentioned authentication program. The preliminary authentication program is stated along a procedure for certification that an authentication program that is an object of an authentication processing is not altered, that is, a procedure for authenticating the authentication program (an authentication procedure).

The mother board 40 is constructed with a general-purpose mother board commercially available (a printed circuit board on which basic parts of a personal computer are mounted) and includes: a main CPU 41; ROM (Read Only Memory) 42;

RAM (Random Access Memory) 43 and a communication interface 44. The main CPU 41 is the processing device of the present invention.

ROM 42 is constituted of a memory device such as a flash memory and stores thereon a program such as BIOS (Basic Input/Output System) executed by the main CPU 41 and permanent data. When BIOS is executed by the main CPU 41, not only is an initialization processing for predetermined peripheral devices conducted, but a capture processing for the game program and the game system program stored on the memory card 53 is also started via the gaming board 50. In the present invention, contents of ROM 42 may be rewritable or not rewritable.

RAM 43 stores data and a program used at the time of operation of the main CPU 41. RAM 43 can store the authentication program read through the gaming board 50 together with the game program and the game system program. RAM 43 is the storage device of the present invention.

RAM 43 is provided with a storage region for a return mode flag. The return mode flag is a flag to be referred to when a game state is to be selected whether it should be shifted to a return mode corresponding to the second special game state or not. The storage region of the return mode flag is constituted of a storage region with, for example, a predetermined number of bits and the return mode flag is turned "ON" or "OFF" according to storage contents in the storage region. If the return mode flag is set to the state "ON", the game state thereafter shifts to the return mode.

Furthermore, the RAM 43 is provided with a storage region of an insurance mode flag. The insurance mode flag is a flag to indicate whether the current mode is the with-insurance mode or the without-insurance mode. The storage region of the insurance mode flag for example comprises a storage region with a specific number of bits, and according to storage contents stored in the storage region, the insurance mode flag is set to "ON" or "OFF". The insurance mode flag being "ON" indicates that the current mode is the with-insurance mode, whereas the insurance mode flag being "OFF" indicates that the current mode is the without-insurance mode. RAM 43 further stores data on the number of credits, the number of coin-in or coin-out for one game, and the like.

The communication interface 44 is used to communicate with the control device 200 through the communication line 101. The main CPU 41 transmits the number of coin-in and the number of coin-out together with the gaming machine identification number of the gaming machine 10 to the control device 200 each time a game is played. The number of games, an accumulative number of coin-in and an accumulative number of coin-out is made to be associated with each gaming machine identification number, and stored in the control device 200. In the control device 200, a set value that is an object of comparison with the number of games is preliminary determined with respect to each gaming machine identification number, and when the number of games of one gaming machine 10 reaches a set value determined for that gaming machine 10, a return command signal is transmitted from the control device 200. When the main CPU 41 receives the return command signal through the communication interface 44, the return mode flag is set to the state "ON".

Both a body PCB (Printed Circuit Board) 60 and a door PCB 80 which will be described later are connected to the mother board 40 by USB. A power supply unit 45 is also connected to the mother board 40. When electric power is supplied from the power supply unit 45 to the mother board 40, not only is the main CPU 41 of the mother board 40 activated, but CPU 51 is also activated from electric power supplied through the PCI bus to the gaming board 50.

Equipment and devices which generate input signals to be input to the main CPU 41, and equipment and devices of which operations are controlled by a control signal output from the main CPU 41 are connected to the body PCB 60 and the door PCB 80. The main CPU 41 executes a game program and a game system program stored in RAM 43 based on an input signal input to the main CPU 41, and thereby performs a predetermined computational processing, stores results thereof into RAM 43 and transmits a control signal to each equipment and device as a control processing for each of the equipment and devices.

A lamp 30, a sub CPU 61, a hopper 66, a coin detecting section 67, a graphic board 68, a speaker 29, a touch panel 69, a note identifier 22, a ticket printer 35, a card reader 36, a key switch 38S and a data display 37 are connected to the body PCB 60. The lamp 30 is lit up in a predetermined pattern based on a control signal output from the main CPU 41.

The sub CPU 61 controls the rotation and stopping of the reels 14 (14L, 14C and 14R). A motor driving circuit 62 equipped with FPGA (Field Programmable Gate array) 63 and a driver 64 is connected to the sub CPU 61. FPGA 63 is an electronic circuit such as LSI capable of programming and works as a control circuit of a stepping motor 70. The driver 64 works as an amplifier circuit of a pulse to be input to the stepping motor 70. The stepping motors 70 (70L, 70C and 70R) which rotate each of the reels 14, are connected to the motor driving circuit 62. The stepping motor 70 is a 1-2 phase excitation type stepping motor.

In the present invention, an excitation type of the stepping motor is not particularly limited, and for example, a motor of a 2 or 1 phase excitation type can be adopted. A DC motor may be adopted instead of a stepping motor. When a DC motor is adopted, a deviation counter, a D/A converter and a servo amplifier are sequentially connected to the sub CPU 61 in this order and the DC motor is connected to the servo amplifier. A rotational position of the DC motor is detected by a rotary encoder and a current rotational position of the DC motor is supplied as data from the rotary encoder to the deviation counter.

An index detecting circuit 65 and a position change detecting circuit 71 are connected to the sub CPU 61. The index detecting circuit 65 is used for detecting positions (indexes described later) of the rotating reels 14 and can also detect an out-of-order state of the reels 14. As for the control of the rotating and stopping of the reels 14, detailed description will be given later by making reference to the figures.

The position change detecting circuit 71 detects a change of stoppage positions of the reels 14 after the stopping of the rotating of the reels 14. The position change detecting circuit 71 detects the change of stoppage positions of the reels 14, for example, in a case where the stoppage position is changed by force by a player as if the combination of symbols was in a wining state, despite the fact that the combination of symbols is not actually in a wining state, and of the like cases. The position change detecting circuit 71 is configured to be capable of detecting the change of stoppage position of the reel 14 by, for example, detecting fins (not shown in the figure) attached with a predetermined space on the inner side of the reel 14.

The hopper 66 is installed in the cabinet 11 and pays out a predetermined number of coins from a coin payout exit 19 to a coin tray 18 based on a control signal output from the main CPU 41. A coin detecting section 67 is installed inside the coin payout exit 19 and when detecting that a predetermined number of coins has been paid out from the coin payout exit 19, outputs an input signal to the main CPU 41.

The graphic board 68 controls, based on a control signal output from the main CPU 41, image displays on the upper image display panel 33 and the lower image display panel 16. The number of credits stored in RAM 43 is displayed on the number-of-credits display section 31 of the lower image display panel 16. The number of coin-out is displayed on the number-of-payouts display section 31 of the lower image display panel 16.

The graphic board 68 is equipped with VDP (Video Display Processor) which generates image data based on a control signal output from the main CPU 41 and a video RAM which temporarily stores image data generated by VDP, and of the like equipments. Note that image data used in generating image data with VDP is read from the memory card 53 and contained in a game program stored in RAM 43.

The note identifier 22 not only discriminates a true note from a false note, but also accepts the true note into the cabinet 11. The note identifier 22, when accepting a true note, outputs an input signal to the main CPU 41 based on a face amount of the note. The main CPU 41 stores the number of credits corresponding to the amount of the note transmitted with the input signal into RAM 43.

The ticket printer 35, based on a control signal output from the main CPU 41, prints on a ticket a bar code obtained by encoding data such as the number of credits, date and time, the identification number of the gaming machine 10, and of the like data stored in RAM 43, and outputs the ticket 39 with a bar code.

The card reader 36 transmits to the main CPU 41 data read from the smart card and writes data onto the smart card based on a control signal from the main CPU 41. The key switch 38S is provided on the keypad 38, and when the keypad 38 is operated by a player, outputs a predetermined input signal to the main CPU 41. The data display 37 displays, based on a control signal output from the main CPU 41, data read by the card reader 36 and data input by a player through the key pad 38.

The control panel 20, a reverter 21S, a coin counter 21C and a cold cathode tube 81 are connected to the door PCB 80. The control panel 20 is provided with a spin switch 23S corresponding to the spin button 23, a change switch 24S corresponding to the change button 24, a CASHOUT switch 25S corresponding to the CASHOUT button 25, a 1-BET switch 26S corresponding to the 1-BET button 26, and a maximum BET switch 27S corresponding to the maximum BET button 27. When the buttons 23 to 27 are operated by a player, each of the switches 23S to 27S corresponding thereto outputs input signals to the main CPU 41.

The coin counter 21C is installed inside the coin receiving slot 21, and discriminates whether a coin inserted by a player into the coin receiving slot 21 is true or false. Coins other than the true ones are discharged from the coin payout exit 19. The coin counter 21C also outputs an input signal to the main CPU 41 when a true coin is detected.

The reverter 21S operates based on a control signal output from the main CPU 41 and distributes coins recognized by the coin counter 21C as true coins into a cash box (not shown in the figure) or the hopper 66, which are disposed in the gaming machine 10. In other words, when the hopper 66 is filled with coins, true coins are distributed into the cash box by the reverter 21S. On the other hand, when the hopper 66 is not filled with coins, true coins are distributed into the hopper 66. The cold cathode tube 81 works as a backlight installed on the back face sides of the lower image display panel 16 and the upper image display panel 33 and is lit up based on a control signal output from the main CPU 41.

Figures 5, 6, 7, 8:
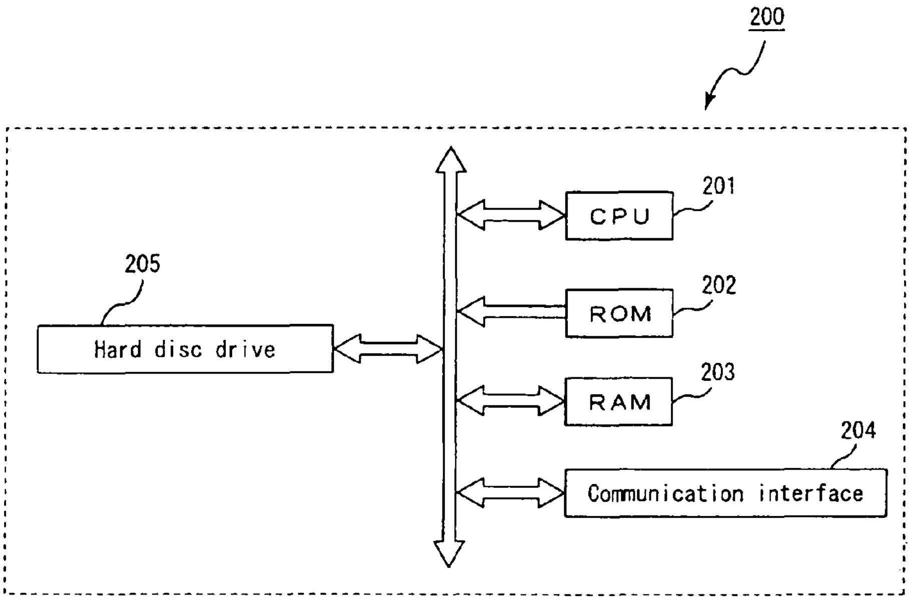
FIG. 5 is a block diagram showing the internal construction of a control device according to one embodiment of the present invention.
FIG. 6 is a figure schematically showing an example of correspondence table between a gaming machine identification number and a game history.
FIG. 7 is a figure schematically showing an example of correspondence table between a set value and the number of payouts.
FIG. 8 is a figure schematically showing another example of correspondence table between a set value and the number of payouts.

FIG. 5 is a block diagram showing the internal construction of a control device according to one embodiment of the present invention.

A control device 200 includes: CPU 201 as a processing device; ROM 202; RAM 203 as a temporary storage device; a communication interface 204; and a hard disc drive 205. The communication interface 204 is connected to the communication interface 44 of the gaming machine 10 through the communication line 101. ROM 202 stores a system program for controlling operations of the control device, a permanent data, and the like. RAM 203 temporarily stores data received from each of the gaming machines 10 and data such as results of the computational operation. Moreover, a game history of a gaming machine 10 is stored in the hard disc drive 205, by being associated with the gaming machine identification number of each of the gaming machines 10.

FIG. 6 is a figure schematically showing an example of correspondence table between a gaming machine identification number and a game history.

Each of the gaming machine identification numbers correspond to a game history based on the number of games, an accumulative number of coin-in, an accumulative number of coin-out, a payment balance in terms of the coins and a return rate of coin-out.

When CPU 201 receives the number of coin-in, the number of coin-out and the gaming machine identification number from the gaming machine 10 through the communication interface 204, a game history corresponding to the gaming machine identification number is updated. More specifically, 1 is added to the number of games, the number of coins inserted is added to the accumulative number of coin-in and the number of coins paid out is added to the accumulative number of coin-out. Furthermore, a payment balance in terms of the coins and a return rate are calculated based on the accumulative number of coin-in and the accumulative number of coin-out. When determining that the number of games after update has reached a set value, the CPU 201 transmits as data a return command signal including the number of coin-out in the return mode, to the gaming machine 10.

FIG. 7 is a figure schematically showing an example of correspondence table between a set value and the number of payouts.

The number of coin-out "500" in the return mode is assigned at a set value of "600".

Note that the correspondence table shown in FIG. 7 is stored on the hard disc drive 205 as data.

In the present invention, the number of payouts in the return mode is not necessarily constant, and for example, the number of payouts may change according to the game history and the like.

FIG. 8 is a figure schematically showing another example of correspondence table between a set value and the number of payouts.

At a set value "600", "(−payment balance)×50% (provided that the number of coin-out=500 if a payment balance>0)" is set as the number of coin-out in the return mode. Hence, if a payment balance is "−2000" when the number of games reaches 600, the number of coin-out is 1000, and if a payment balance is "−4000", the number of coin-out is 2000.

Next, description will be given of a processing performed in the gaming machine 10.

Figure 9:
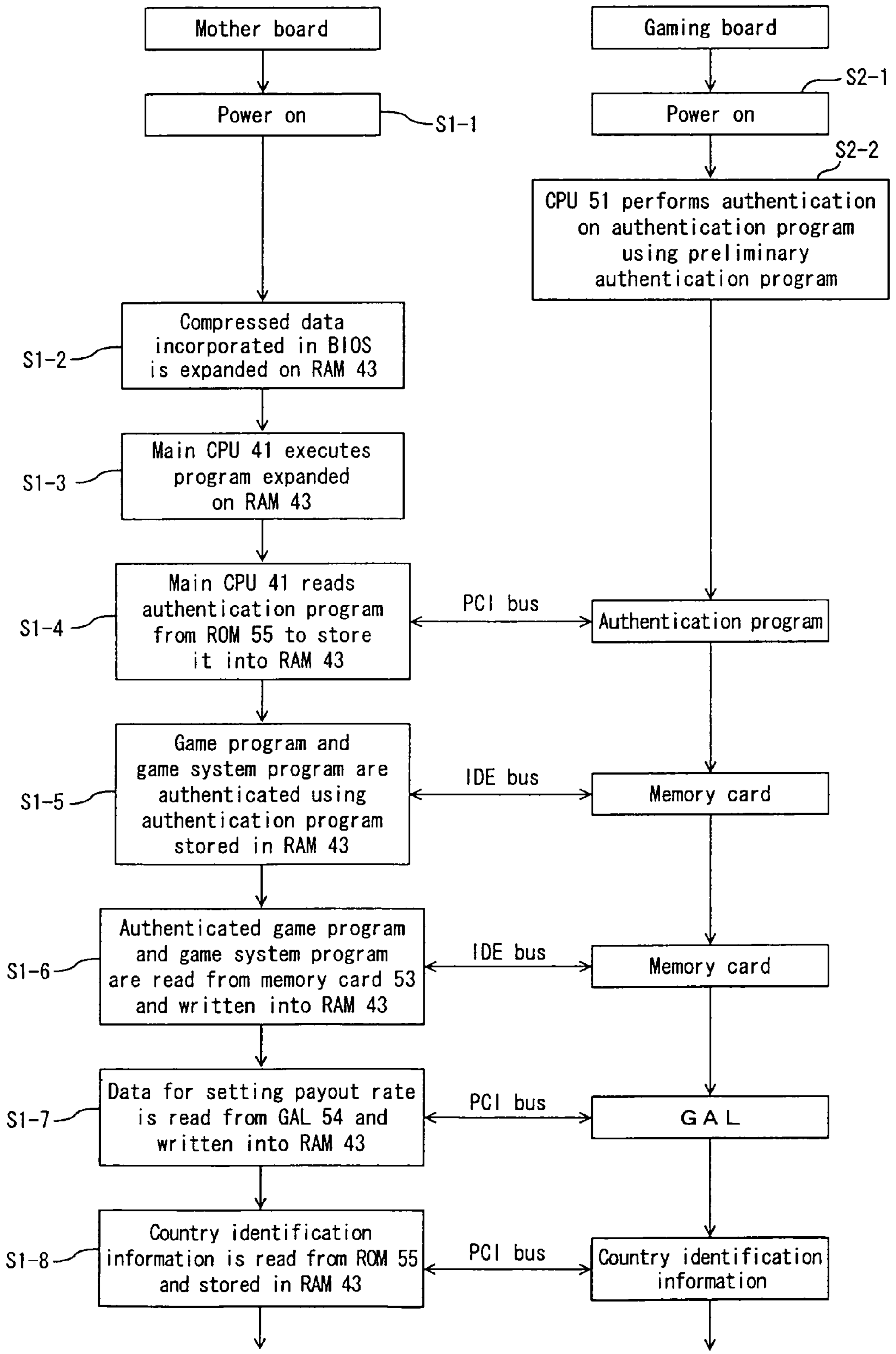
FIG. 9 is a flowchart showing a procedure in an authentication reading processing for a game program and a game system program executed by a mother board and a gaming board shown in FIG. 4.

FIG. 9 is a flowchart showing a procedure in an authentication reading processing for a game program and a game system program executed by a mother board 40 and a gaming board 50 shown in FIG. 4. Note that the memory card 53 is inserted into the card slot 53S on the gaming board 50 and GAL 54 is mounted to the IC socket 54S.

When a power supply switch is turned on in the power supply unit 45, the mother board 40 and the gaming board 50 are activated (steps S1-1 and S2-1). When the mother board 40 and the gaming board 50 are activated, separate processing are performed at the same time. That is, in the gaming board 50, CPU 51 reads a preliminary authentication program stored in the boot ROM 52 and performs the preliminary authentication which in advance, prior to capturing the authentication program into the mother board 40, confirms or certificates that the program is not altered according to the read preliminary authentication program (step S2-2). On the other hand, in the mother board 40, the main CPU 41 executes BIOS stored in ROM 42 to expand on RAM 43 compressed data incorporated in BIOS (step S1-2). Then, the main CPU 41 executes BIOS expanded on RAM 43 to perform diagnosis on and initialization of various kinds of the peripheral devices (step S1-3).

Then, since ROM 55 on the gaming board 50 is connected to the main CPU 41 through PCI bus, the main CPU 41 not only performs reading of the authentication program stored in ROM 55, but also stores the read authentication program into RAM 43 (step S1-4). On this occasion, the main CPU 41 takes a check sum according to ADDSUM method (a standard check function) with the help of the function of a standard BIOS of BIOS, and by performing a confirmation processing for whether or not storage is conducted without error, stores the authentication program into RAM 43.

Then, after confirming what is connected to the IDE bus, the main CPU 41 accesses the memory card 53 inserted into the card slot 53S through the IDE bus, and conducts reading of the game program and the game system program from the memory card 53. In this case, the main CPU 41 reads 4 bites at a time of data constituting the game program and the game system program. Next, the main CPU 41 authenticates by confirming and certifying according to the authentication program stored in RAM 43, that the read game program and game system program have not been altered (step S1-S). When the authentication processing is normally completed, the main CPU 41 writes and stores in RAM 43 the game program and the game system program that have been an object of authentication (have been authenticated) (steps S1-6). Then, main CPU 41 accesses through the PCI bus to GAL 54 mounted to the IC socket 54S, reads data for setting a payout rate from GAL 54 and writes and stores the data in RAM 43 (step S1-7). Then, the main CPU 41 not only reads through the PCI bus country identification information stored in ROM 55 on the gaming board 50, but also stores the read country identification information into RAM 43 (step S1-8).

After the processing is over, the main CPU 41 sequentially reads and executes the game program and the game system program to such that a game is progressed.

After the processing shown in FIG. 9 is over, the main CPU 41 performs a game state selection processing.

Figure 10:
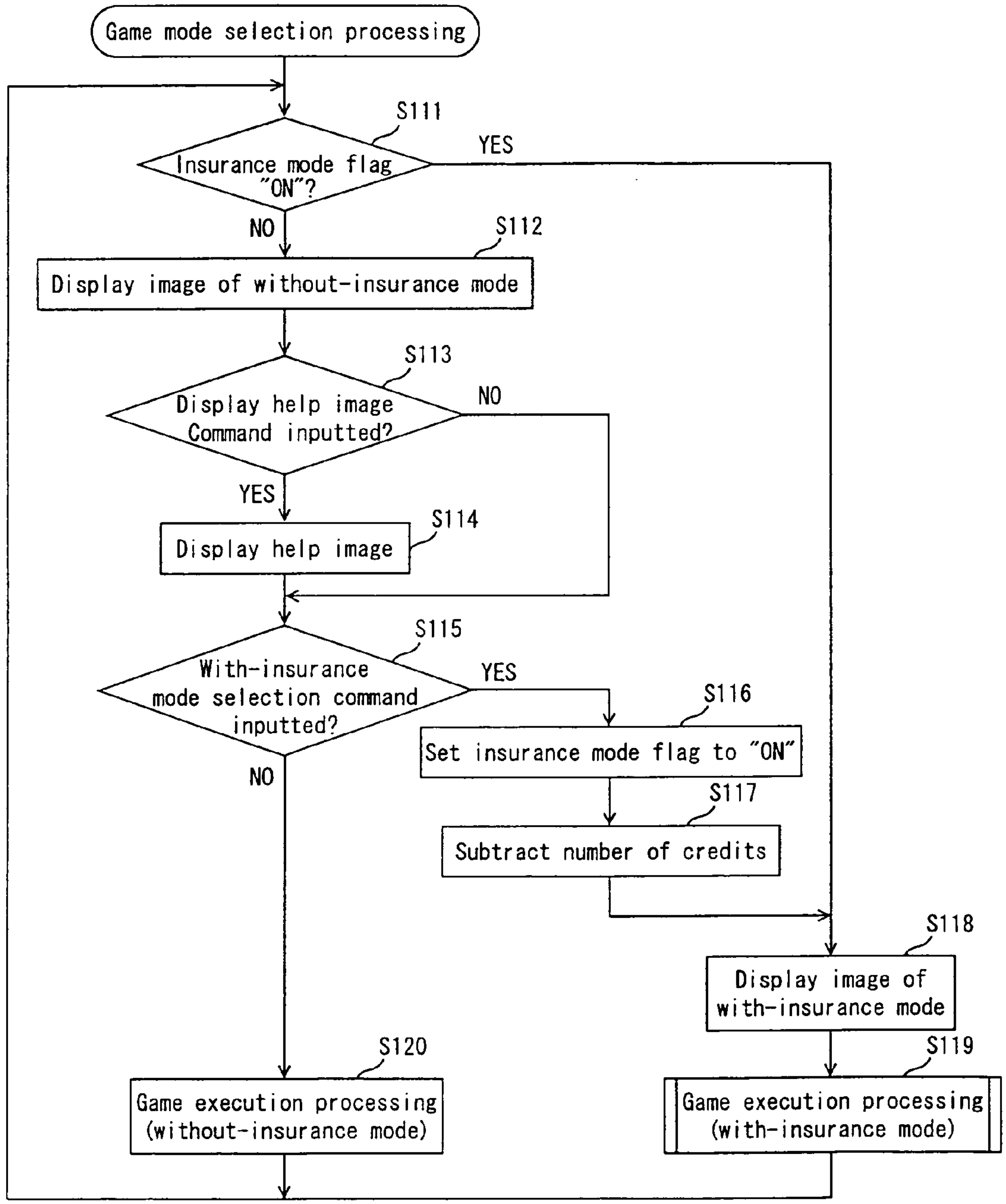
FIG. 10 is a flowchart showing a subroutine of a game state selection processing.

FIG. 10 is a flowchart showing a subroutine of a game state selection processing.

The main CPU 41 conducts a processing for adding credits stored in RAM 43 as an interrupt processing when it receives a detection signal output from the coin counter 21C in a case where the coin counter 21C detects a coin inserted into the coin receiving slot 21 while executing the subroutine.

First, the main CPU 41 determines whether or not the insurance mode flag stored in the RAM 43 has been set to "ON" (step S11). In determining that the insurance mode flag has not been set to "ON", i.e., the insurance mode flag has been set to "OFF", the main CPU 41 performs the processing of displaying an image of the without-insurance mode (step S112).

In this processing, the main CPU 41 transmits a depiction command of the image for the without-insurance mode to the graphic board 68. On the graphic board 68, a VDP extracts image data from the RAM 43 to be developed in a video RAM, based upon the depiction command, and produces one frame of image data to be outputted to the upper image display panel 33 and the lower image display panel 16. As a result, for example, images as shown in FIG. 11 are displayed on the upper image display panel 33 and the lower image display panel 16.

Figure 11:
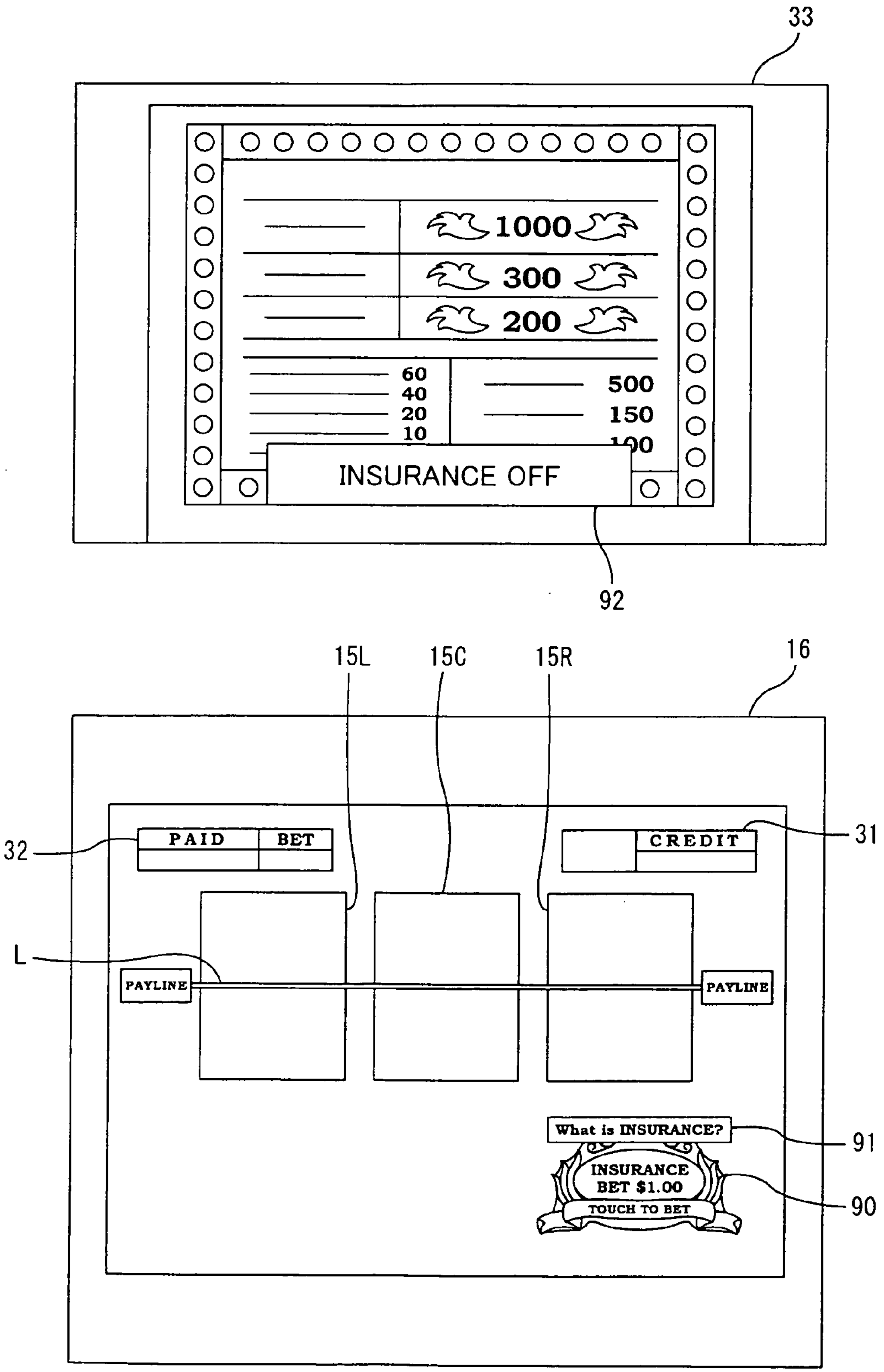
FIG. 11 is a figure showing one example of images displayed on the upper image display panel and the lower image display panel in the without-insurance mode.

FIG. 11 is a figure showing one example of images displayed on the upper image display panel and a lower image display panel in the without-insurance mode. In the figure, numeral 15 (15L, 15C, 15R) denotes display windows. Numeral 31 denotes the number-of-credits display section. Numeral 32 denotes the number-of-payouts display section. Character L denotes the winning line.

On the right lower part of the lower image display panel 16, an image 90 showing "INSURANCE BET $1.00, TOUCH TO BET" is displayed. The image 90 is an image for requesting the player to select the with-insurance mode and insertion of game media necessary for selection of the with-insurance mode. The player touches a predetermined part of the touch panel 69 corresponding to the display region of the image 90, so as to input the command for selecting the with-insurance mode.

The selection of the with-insurance mode requires a specific number of credits (one dollar in the present embodiment) As an alternative of the number of credits, a note or a coin equivalent to the number of credits may be inserted. In a case where the with-insurance mode has been selected, when the number of games reaches a set value (for example, 600) Without a bonus game being generated, the return mode flag is set to the state "ON" and a game state shifts to the return mode. In the return mode, the player can acquire a specific number (500 in the present embodiment) of coins, or credits equivalent thereto.

In other words, in the with-insurance mode, a game can be played in a state where an insurance is carried for compensating all or part of a loss arising in a case where no bonus game has arisen for a long time.

On the other hand, the without-insurance mode is selected when the command for selecting the with-insurance mode is not input. In a case where the without-insurance mode has been selected, the return mode flag is not set to the state of "ON" and a game state does not shift to the return mode even if no bonus game has arisen for a long time after the without-insurance mode is selected.

An image 91 showing "What is INSURANCE?" is displayed on the upward side of the image 90. The image 91 is an image for inputting a command for displaying a help image. The player touches a predetermined part of the touch panel 69 corresponding to the display region of the image 91 so as to input the command for displaying the help image.

An image 92 showing "INSURANCE OFF" is displayed on the lower part of the upper image display panel 33. The image 92 is an image showing that the current game state is the without-insurance mode.

After the processing of step S112, the main CPU 41 determines whether or not the command for displaying the help image has been inputted (step S113). The command for displaying the help image is inputted when the player touches the predetermined part of the touch panel 69 corresponding to the display region of the image 91, as described above.

When the command for displaying the help image is inputted, a processing of displaying the help image is performed (step S114). In this processing, the main CPU 41 transmits a depiction command of the help image to the graphic board 68. The graphic board 68 performs the processing of displaying images on the upper image display panel 33 and the lower image display panel 16 based upon the above-mentioned depiction command. As a result, images as shown in FIG. 12 are for example displayed on the upper image display panel 33 and the lower image display panel 16.

FIG. 12 is a figure showing one example of images displayed on the upper image display panel and the lower image display panel in the without-insurance mode.

The images on the upper image display panel 33 and the lower image display panel 16 are substantially the same as the images shown in FIG. 11. However, the images in FIG. 12 are different from those in FIG. 11 in that a help image 93 is displayed on the upper part of the upper image display panel 33.

The help image 93 is an image showing "INSURANCE HELP MESSAGE, when bonus game trigger "APPLE" does not appear during MAXBET of 600 games, insurance of 500 credits is paid out". The help image 93 shows a word description of the with-insurance mode. It should be noted that the help image 93 shown in FIG. 12 disappears when a predetermined period of time (for example, ten seconds) lapses from the display thereof.

When the processing of step S114 is performed, or when the command for displaying the help image is not inputted in step S113, the main CPU 41 determines whether or not the command for selecting the with-insurance mode has been inputted (step S115). As described above, the command for selecting the with-insurance mode is inputted when the player touches the predetermined part of the touch panel 69 corresponding to the display region of the image 90.

When the command for selecting the with-insurance mode is inputted, the main CPU 41 sets the insurance mode flag, stored in the RAM 43, to "ON" (step S116). Subsequently, the main CPU 41 performs the processing of subtracting a specific number of credits (in the present embodiment, the number of credits equivalent to one dollar) from the number of credits stored in the RAM 43 (step S117).

In step S111, when the insurance mode flag is determined to have been set to "ON", or the processing of step S117 is performed, the processing of displaying the with-insurance mode is performed (step S118).

In this processing, the main CPU 41 (processing device) transmits a depiction command of an image for the with-insurance mode to the graphic board 68. On the graphic board 68, the VDP extracts image data from the RAM 43 (storage device) to be developed in a video RAM, and produces one frame of image data to be outputted to the upper image display panel 33 and the lower image display panel 16. As a result, images as shown in FIG. 13 are for example displayed on the upper image display panel 33 and the lower image display panel 16.

Figure 13:
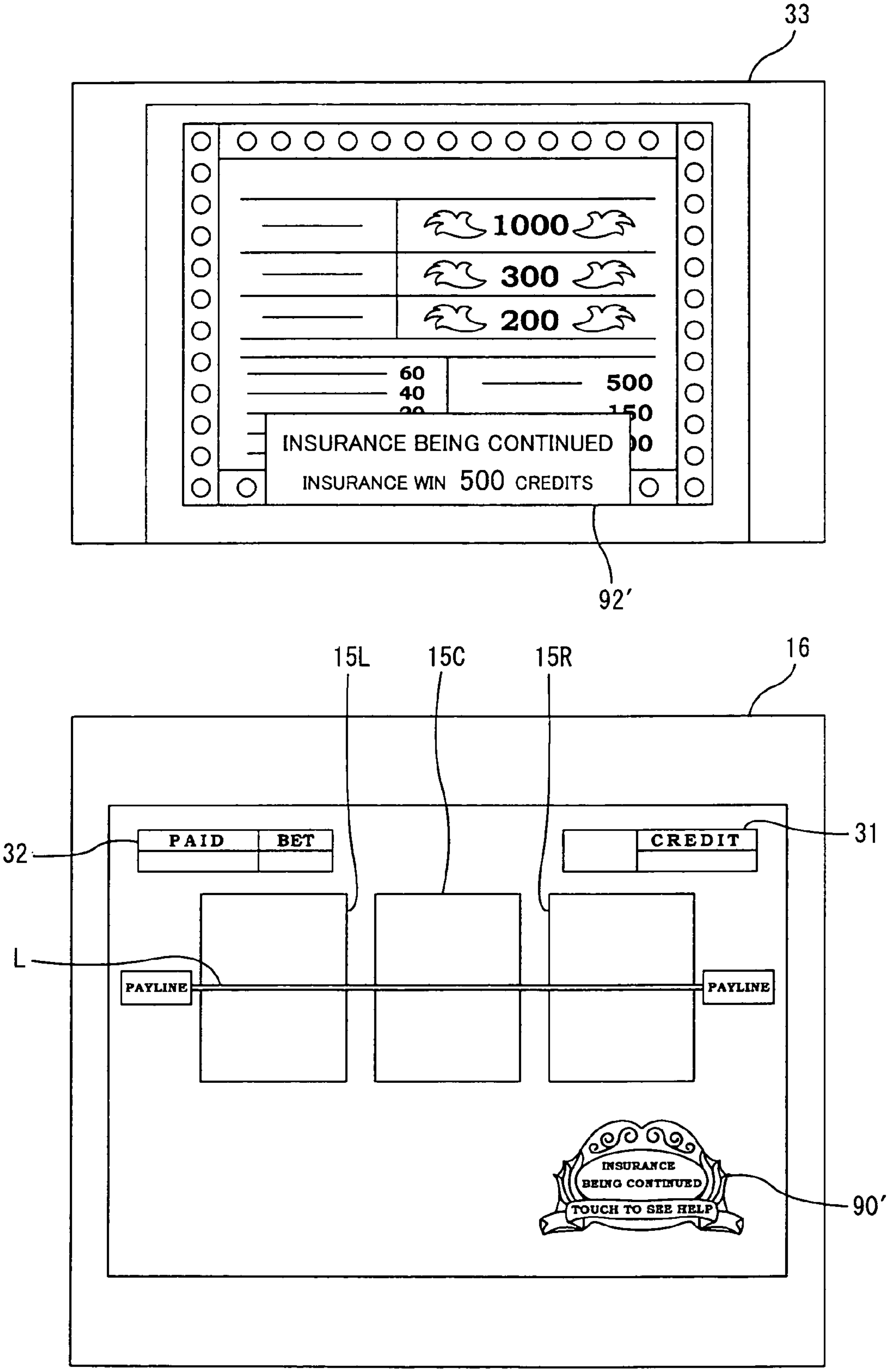
FIG. 13 is a figure showing one example of images displayed on the upper image display panel and the lower image display panel in the with-insurance mode.

FIG. 13 is a figure showing one example of images displayed on the upper image display panel and the lower image display panel in the with-insurance mode.

An image 90' showing "INSURANCE BEING CONTINUED, TOUCH TO SEE HELP" is displayed on the right lower part of the lower image display panel 16 in place of the image 90 (see FIG. 11). The image 90' is an image showing that the current game state is the with-insurance mode as well as an image for inputting the command for displaying the help image. The player can input the command for displaying the help image by touching the predetermined part of the touch panel 69 corresponding to the display region of the image 90'.

An image 92' showing "INSURANCE BEING CONTINUED, INSURANCE WIN 500 CREDITS" is displayed on the lower part of the upper image display panel 33. The image 92' is an image showing that the current game state is the with-insurance mode, and that the number of credits to be given to the player when the game state is shifted to the return mode is 500.

After the processing of step S118, the main CPU 41 performs a game executing processing in the with-insurance mode (step S119). While this processing is later described in detail using FIG. 14, in the with-insurance mode, the image 92' is displayed on the upper image display panel 33 and the image 90' is displayed on the lower image display panel 16.

On the other hand, when the command for selecting the with-insurance mode is not inputted in step S115, the main CPU 41 performs a game executing process in the without-insurance mode (step S120). This processing is substantially the same as the game executing processing in the with-insurance mode (see FIG. 14), except that the processing according to the transition to the return mode and the processing according to counting of the number of games are not performed; hence description thereof is omitted herein. It should be noted that in the without-insurance mode, the image 92 is displayed on the upper image display panel 33, and the images 90, 91 are displayed on the lower image display panel 16. When the processing of step S119 or S120 is performed, the processing is then returned to step S11.

In the present embodiment, a case was described where the images 90', 92' for notifying that the game state has been shifted to the with-insurance mode are displayed on the upper image display panel 33 and the lower image display panel 16. However, in the present invention, sound for notifying that the game state has been shifted to the with-insurance mode may be output from the speaker 29.

Figure 14:
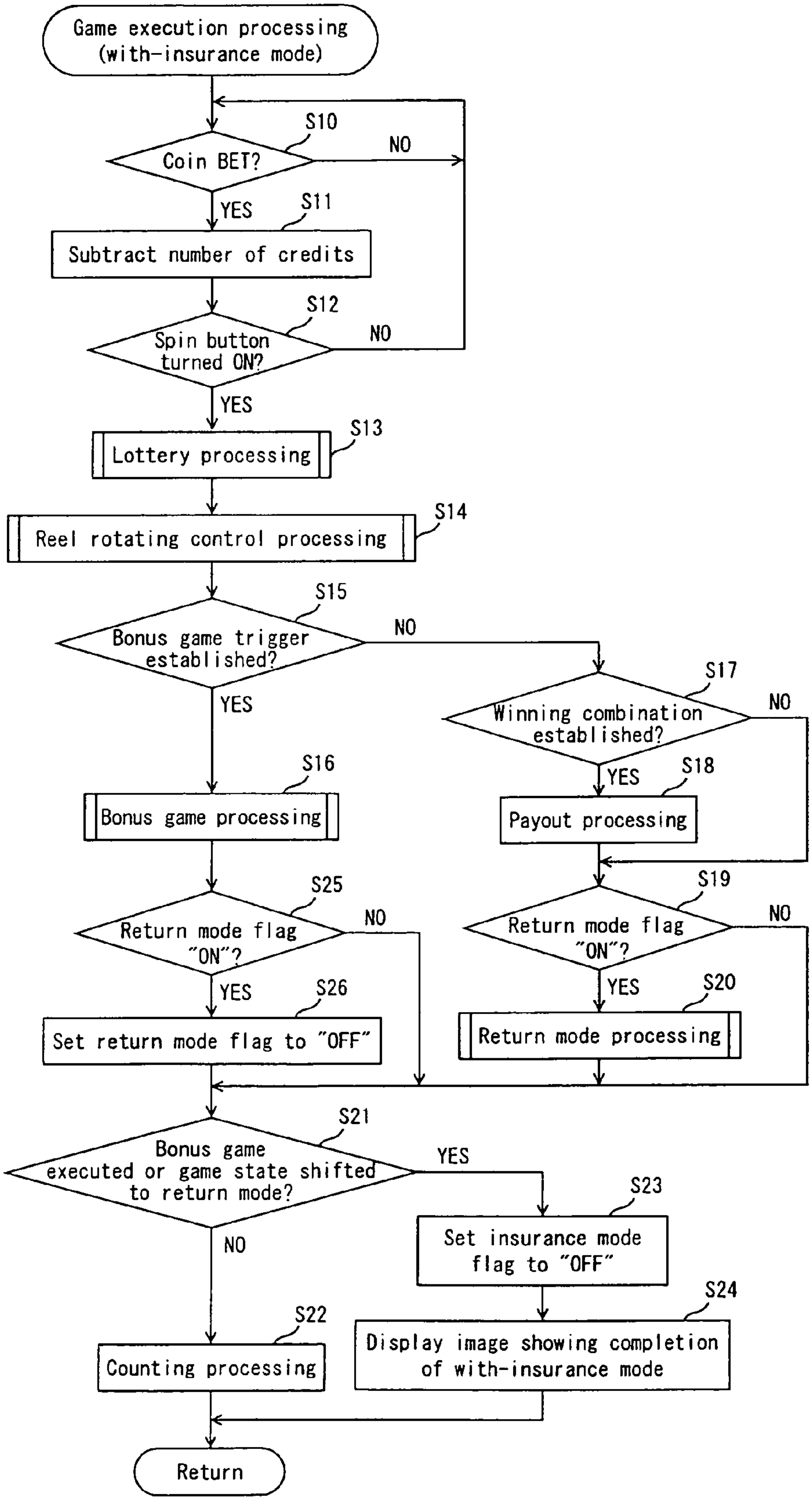
FIG. 14 is a flowchart showing a subroutine of a game execution processing.

FIG. 14 is a flowchart showing a subroutine of a game execution processing in the with-insurance mode that is called and executed in step S119 of the subroutine shown in FIG. 10.

In the game execution processing, the main CPU 41 at first determines whether or not a coin is BET (step S10). In the processing, the main CPU 41 determines whether an input signal output from the 1-BET switch 26S or the maximum BET switch 27S has been received or not when the 1-BET button 26 or the maximum BET button 27 is operated, respectively. If it is determined that a coin has not been BET, the process returns to step S10.

On the other hand, if it is determined in step S10 that a coin is BET, the main CPU 41 conducts a processing for subtracting the number of credits stored in RAM 43 according to the number of BET coins (step S11). In a case where the number of BET coins is more than the number of credits stored in RAM 43, the process returns to step S10 without conducting subtraction on the number of credits stored in RAM 43. In a case where the number of BET coins exceeds the upper limit (50 coins in the present embodiment) up to which a BET is possible in one game, the processing advances to step S12 without conducting a processing for subtracting the number of BET coins from the number of credits stored in RAM 43.

Then, the main CPU 41 determines whether the spin button 23 has been turned ON or not (step S12). In the processing, the main CPU 41 determines, when the spin button 23 is pressed, whether an input signal output from the spin switch 23S has been received or not.

If it is determined that the spin button 23 has not been turned ON, the processing returns to step S10. Note that in a case where the spin button has not been turned ON (for example, in a case where a command of terminating a game has been input without turning ON the spin button 23), the main CPU 41 cancels a result of the subtracting processing in step S11.

In the present embodiment, description will be given of a case in which: after a coin is BET (step S10), a processing for conducting subtraction on the number of credits (step S11) is conducted prior to the determination on whether the spin button 23 has been turned ON or not (step S12). However, the present invention is not limited to this example. For example, a processing for subtraction on the number of credits (step S11) may be conducted after a coin is BET (step S10), determined whether the spin button 23 has been turned ON or not (step S12), and when determined that the spin button 23 has been turned ON (YES in step S12).

Meanwhile, in step S12 of FIG. 14, if it is determined that the spin button 23 has been turned ON therein, the main CPU 41 conducts a lottery processing (step S13). In the lottery processing, the main CPU 41 (processing device) executes a lottery program stored in RAM 43 (storage device) to thereby determine a code No. of the stopped reels 14. Thus, a combination of symbols stop displayed is determined. Detailed description of the processing will be given later by making reference to FIGS. 17 and 18. In the present embodiment, description will be given of a case where a combination of symbols stop displayed is determined, and one winning combination of plural winning combinations is determined thereafter. However, in the present invention, one winning combination selected from plural winning combinations may at first be determined by a lottery, and the combination of symbols to be stop displayed may be determined thereafter, based on the determined winning combination.

Then, the main CPU 41 conducts a reel rotating control processing (step S14). The processing is a processing which, after all of the reels 14 starts to rotate, stops the rotating of each of the reels 14 such that a combination of symbol sequences corresponding to the winning combination determined in step S13 is stop displayed on the winning line L. Detailed description of the processing will be given later by making reference to FIGS. 19 to 21.

Then, the main CPU 41 determines whether a bonus game trigger has been established or not, that is whether "APPLE" is stop displayed in the display window 15 or not (step S15) If it is determined that the bonus game trigger has been established, the main CPU 41 (processing device) reads a program for conducting a bonus game from RAM 43 (storage device) to execute a bonus game processing (step S16). Here, the first special game state is generated. Detailed description of the bonus game processing will be given later by making reference to FIG. 24.

After the processing in step S16, it is determined whether or not the return mode flag has been set to "ON" (step S25). Having been set to "ON", the return mode flag is set to "OFF" (step S26).

On the other hand, if it is determined in step S15 that the bonus game trigger has not been established, the main CPU 41 determines whether a winning combination has been established or not (step S17). If it is determined that a winning combination has been established, the main CPU 41 conducts payout of a coin corresponding to the number of coin-in and the winning combination (step S18). In a case where coins are reserved, the main CPU 41 conducts a processing to add the coins to the number of credits stored in RAM 43. On the other hand, in a case where payout of a coin is conducted, the main CPU 41 transmits a control signal to the hopper 66 and conducts payout of a predetermined number of coins. In that situation, the coin detecting section 67 counts the number of coins paid out from the hopper 66 and when the number of counts reaches a designated number, transmits a payout completion signal to the main CPU 41. Thus, the main CPU 41 stops the driving of the hopper 66 to terminate the coin payout processing.

When it is determined that no winning combination has been established (that a winning combination has failed to be established) in step S17, or when the processing of step S18 has been executed, the main CPU 41 determines whether the return mode flag stored in RAM 43 is set to the state "ON" or not (step S19). If it is determined that the return mode flag has been set to the state "ON", the main CPU 41 (processing device) reads from RAM 43 (storage device) a program for shifting a game state to the return mode, executes the return mode processing, to thus shift a game state to the return mode (step S20). Here, the second special game state has been generated. Detailed description will be given of the return mode processing later using FIG. 25.

In step S19 or S25, when determining that the return mode flag has not been set to "ON", or performing the processing of step S20 or S26, the main CPU 41 determines (step S21) whether or not the bonus game has been executed (step S16) or the game state has been shifted to the return mode (step S20).

If it is determined that a bonus game has not been executed, or that a game state has not shifted to the return mode, the main CPU 41 executes a counting processing (step S22).

The counting processing is a processing conducted between the gaming machine 10 and the control device 200. The number of coin-in and the number of coin-out for one game together with the gaming machine identification number are transmitted from the gaming machine 10 to the control device 200. In the control device 200, the number of games, an accumulative number of coin-in, an accumulative number of coin-out and the like are updated with respect to each gaming machine identification number. When the number of games reaches a set value, the number of coin-out in the return mode is determined according to the set value, and a return command signal showing the set value and the number of coin-out is transmitted to the gaming machine 10 from the control device 200. The main CPU 41, when receiving the return command signal, sets the return mode flag to the state "ON". Detailed description of the counting processing will be given later by making reference to FIG. 27.

On the other hand, when it is determined that the bonus game has been executed or the game state has been shifted to the return mode in step S21, the insurance mode flag is set to "OFF" (step S23)

Next, the main CPU 41 performs a processing of displaying an image showing completion of the with-insurance mode on the upper image display panel 33 and the lower image display panel 16 (step S24).

In this processing, the main CPU 41 transmits a depiction command of the image showing completion of the with-insurance mode to the graphic board 68. On the graphic board 68, the VDP extracts image data from the RAM 43 to be developed in the video RAM, based upon the depiction command, and produces one frame of image data to be outputted to the upper image display panel 33 and the lower image display panel 16. As a result, for example, images as shown in FIG. 15 or 16 are displayed on the upper image display panel 33 and the lower image display panel 16.

Figure 15:
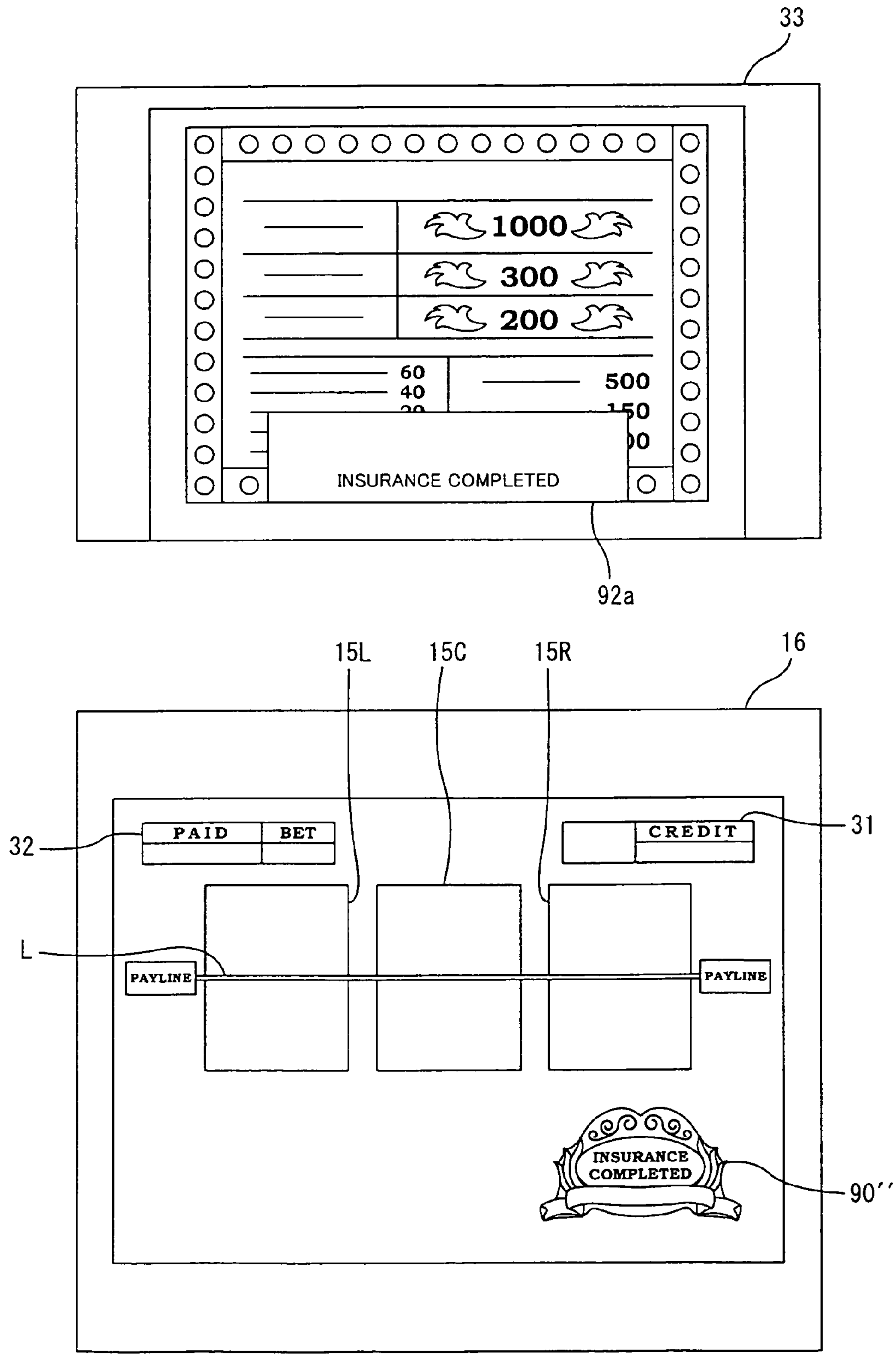
FIG. 15 is a figure showing one example of images displayed on the upper image display panel and the lower image display panel when the with-insurance mode has been completed due to shift of the game state to the return mode.

FIG. 15 is a figure showing one example of images displayed on the upper image display panel and the lower image display panel when the with-insurance mode has been completed due to shift of the game state to the return mode.

An image 90" showing "INSURANCE COMPLETED" is displayed on the right lower part of the lower image display panel 16 in place of the image 90' (see FIG. 13). The image 90" is an image showing that the with-insurance mode has been completed. An image 92*a* showing "INSURANCE COMPLETED" is displayed on the lower part of the upper image display panel 33. The image 92*a* is also an image showing that the with-insurance mode has been completed.

Figure 16:
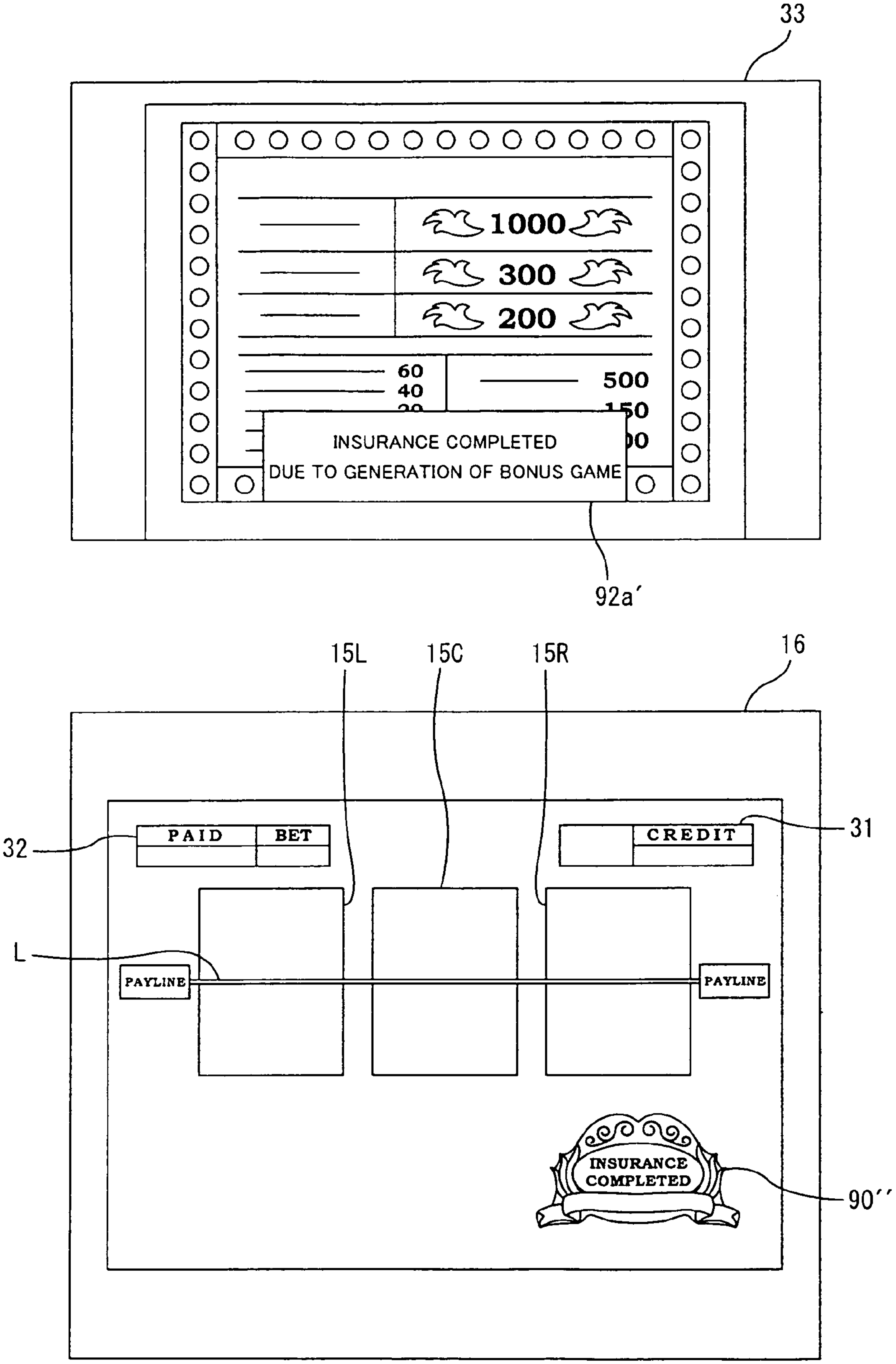
FIG. 16 is a figure showing one example of images displayed on the upper image display panel and the lower image display panel when the with-insurance mode has been completed due to generation of a bonus game.

FIG. 16 is a figure showing one example of images displayed on the upper image display panel and the lower image display panel when the with-insurance mode has been completed due to generation of the bonus game.

An image 90" showing "INSURANCE COMPLETED" is displayed on the right lower part of the lower image display panel 16. An image 92*a'* showing "INSURANCE COMPLETED DUE TO GENERATION OF BONUS GAME" is displayed on the lower part of the upper image display panel 33. The image 92*a'* is an image showing that the with-insurance mode has been completed due to generation of the bonus game.

As thus described, in the gaming machine 10, an image to be displayed is different depending on whether the with-insurance mode has been completed due to the shift of the game state to the return mode or the with-insurance mode has been completed due to generation of the bonus game. When the processing of the step S22 or S24 is performed, the present subroutine is completed.

As thus described, when the bonus game trigger is established in the with-insurance mode (step S15: YES), the main CPU 41 generates the bonus game (step S16), and then sets the insurance mode flag to "OFF" (step S23).

By setting of the insurance mode flag from "ON" to "OFF", the game state is shifted from the with-insurance mode to the without-insurance mode.

The processing of the step S23 corresponds to the processing performed by the main CPU 41 (processing device) which reads from the RAM 43 (storage device) a program for shifting the game state from the with-insurance mode to the without-insurance mode when a winning combination determined in the with-insurance mode is the special winning combination "bonus game trigger", and then executes the program.

In the present embodiment, a case was described where the game state is shifted from the with-insurance mode to the without-insurance mode when a winning combination determined in the with-insurance mode is the special winning combination "bonus game trigger". However, the present invention is not limited to this example. For example, when the winning combination determined in the with-insurance mode is a predetermined winning combination, the game state may be shifted from the with-insurance mode to the without-insurance mode. Namely, the winning combination which is a trigger for the shift from the with-insurance mode to the without-insurance mode is not necessarily required to be the special winning combination "bonus game trigger".

Furthermore, in the present invention, a predetermined condition for a trigger for the shift from the with-insurance mode to the without-insurance mode is not limited to the condition that the winning combination determined in the with-insurance mode is a predetermined winning combination. Examples of the predetermined condition may include a payment balance in terms of the game media in the with-insurance mode becoming equal to or more than a predetermined value, and a payout rate (the number of coin-out/the number of coin-in) of the game medium in the with-insurance mode becoming equal to or more than a predetermined value.

After performing the processing of the step S24 in FIG. 14, the main CPU 41 returns the processing to FIG. 10. In this case, since the insurance mode flag has been set to "OFF" (step S11: NO), the main CPU 41 again performs the processing of displaying images of without-insurance mode (see step S112 in FIG. 11). This as a result enables the player to again perform an operation for shift from the without-insurance mode to the with-insurance mode.

FIG. 17 is a flowchart showing a subroutine of a lottery processing called and executed in step S13 of the subroutine shown in FIG. 14. The processing is a processing conducted by executing a lottery program stored in RAM 43 with the main CPU 41. The main CPU 41 executes a random number generating program included in the lottery program, and a random number value from the numerical value range of 0 to 255 is selected thereby such that each of the selected random number values correspond to each of the three reels 14 (step S31). In the present embodiment, description will be given of a case where random numbers are generated on a program (a case where so-called software random numbers are used). In the present invention, however, a random number generator may be used, and random numbers may be extracted therefrom (so-called hardware random numbers may be used).

Then, the main CPU 41 (processing device) refers to symbol weighting determination data corresponding to payout rate setting data which is output from GAL 54 and stored in RAM 43 (storage device), and determines, based on the selected three random number values, code Nos. (see FIG. 3) for each of the reels 14 (step S32). The code Nos. of the reels 14 correspond to code Nos. of the symbols stop displayed on the winning line L. The main CPU 41 determines code Nos. of the reels 14 to thereby determine a winning combination. For example, in a case where code Nos. of the reels 14 are determined "00", "00" and "00", it means that the main CPU 41 determined a winning combination as "JACKPOT". Based on the code Nos. determined for each of the reels, a reel rotating control processing which will be described later is conducted.

Here, description of a winning combination in the present embodiment will be given.

FIG. 18 is a figure describing a relationship among winning combinations of plural kinds, establishment possibility of each winning combination and the number of coin-out in the present embodiment. The establishment possibilities of each of the winning combinations shown in FIG. 18 are of a case where a payout rate is set to 88% in a game other than a bonus game. The establishment possibilities shown in the figure show possibilities of the establishment of each of the shown winning combinations in such a case that code Nos. of each of the reels 14 are determined based on the selected three random number values by referring to a symbol weighting determination data. In other words, the random number values are not made to correspond to each of the winning combinations.

An establishment possibility of a bonus game trigger is 0.5%. If a player hits the bonus game trigger, three "APPLE" symbols are stop displayed on the winning line L and a bonus game is generated. In the bonus game, executed is a free game of which the number of games is determined by a lottery.

An establishment possibility of "JACKPOT 7" is 0.5%. If this winning combination has been established, three "JACKPOT 7" symbols are stop displayed on the winning line L, and 30 coins per one coin-in are paid out. The lower the establishment possibility of the winning combination is, the higher the number of coin-out is set. When a combination of symbols stop displayed is not hitting any of the winning combinations shown in FIG. 18, this is a failure, and there is no coin-out.

Figure 19:
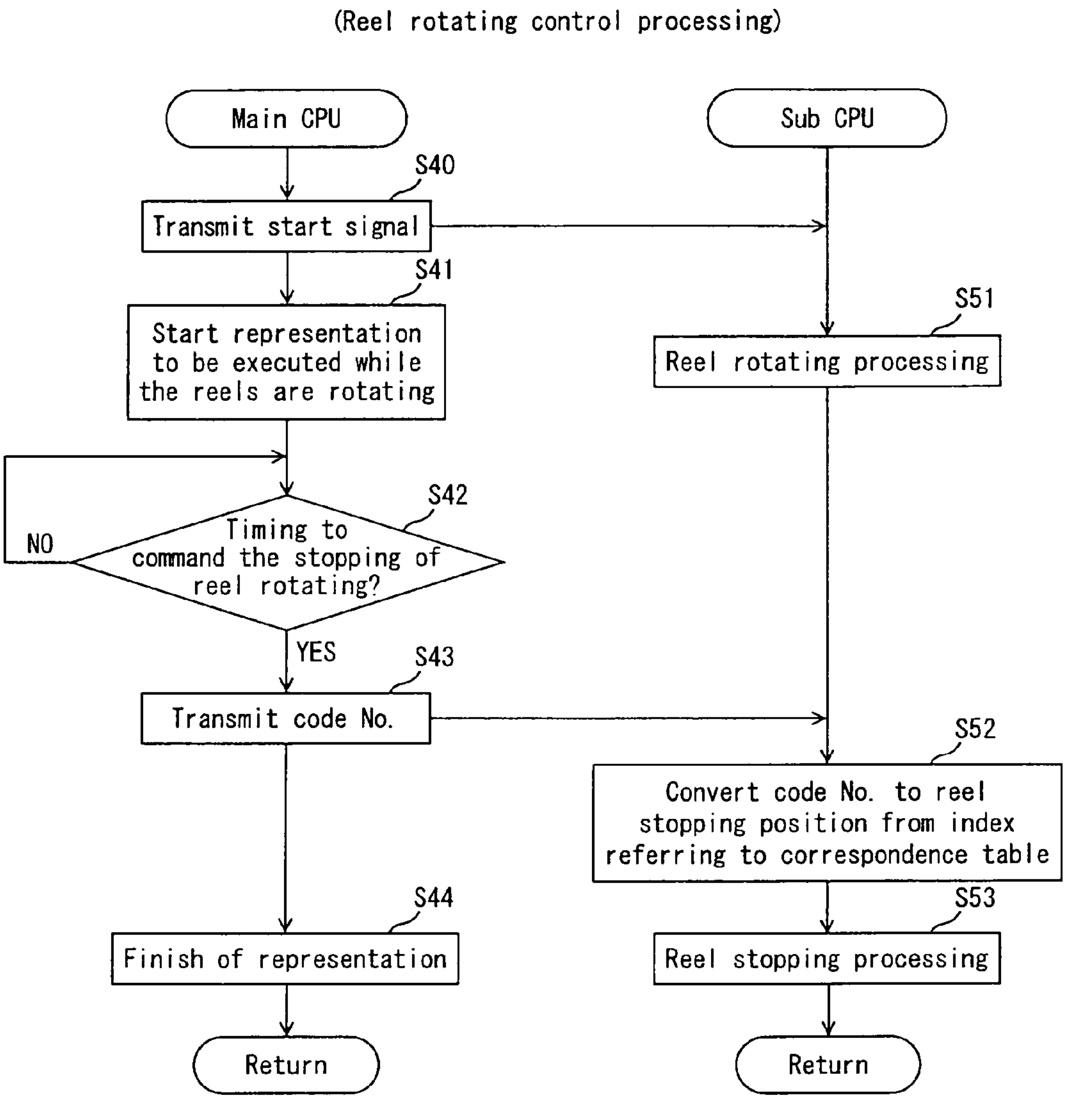
FIG. 19 is a flowchart showing a subroutine of a reel rotating control processing.

FIG. 19 is a flowchart showing a reel rotating control processing called and executed in step S14 of the subroutine shown in FIG. 14. This processing is a processing conducted between the main CPU 41 and the sub CPU 61.

The main CPU 41 transmits to the sub CPU 61 a start signal that starts the rotating of reels (step S40). The sub CPU 61 conducts a reel rotating processing when it receives the start signal from the main CPU 41 (step S51). In the processing, the sub CPU 61 supplies a pulse to the motor driving circuit 62. The pulse output from the sub CPU 61 is amplified by the driver 64 and supplied to each of the stepping motors 70 (70L, 70C and 70R). As a result, the stepping motors 70 rotate, thereby making the reels 14 (14L, 14C and 14R) to rotate. A stepping motor 70 is a 1-2 phase excitation type stepping motor which has a step angle of 0.9 degree and requires the number of steps of 400 for one rotation. Hence, if 400 pulses are supplied to the stepping motor 70, the reels 14 rotate once.

When the reels 14 start to rotate, the sub CPU 61 supplies to the motor driving circuit 62 pulses at a lower frequency, and the pulse frequency is gradually raised. A rotational speed of the reels 14 is thereby increased. When a predetermined time elapses, the pulse frequency is controlled to be constant. As a result, the reels 14 rotate at a constant speed.

Here, description of a rotational operation of the reels 14 will be given, by using FIG. 20.

FIGS. 20A to 20D are side views for describing a rotating operation of a reel 14.

Figure 20A:
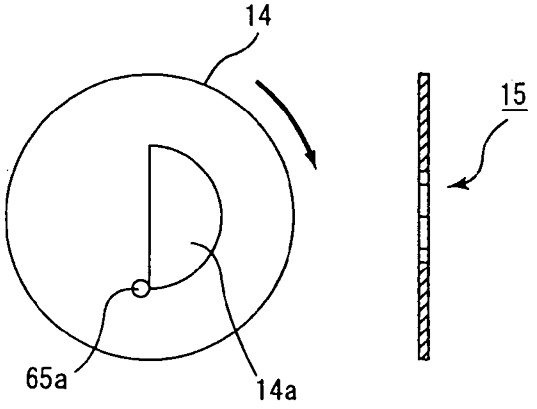
FIGS. 20A to 20D are side views for describing a rotating operation of the reel.

As shown in FIG. 20A, a semicircular metal plate 14*a* is attached to the side surface of a reel 14. The metal plate 14*a* rotates together with the reel 14. Twenty two symbols (see FIG. 3) are depicted on the circumferential surface of the reel 14. Three symbols of the twenty two symbols depicted on the circumferential surface of the reel 14 can be visually recognizable through the display window 15 formed in front of the reel 14. The arrow mark of a heavy line in the figure indicates a rotating direction of the reel 14. A proximity sensor 65*a* is provided on the side of the reel 14. The proximity sensor 65*a* is used to detect the metal plate 14*a*. The proximity sensor 65*a* does not rotate nor move even if the reel 14 rotates.

Figure 20B:
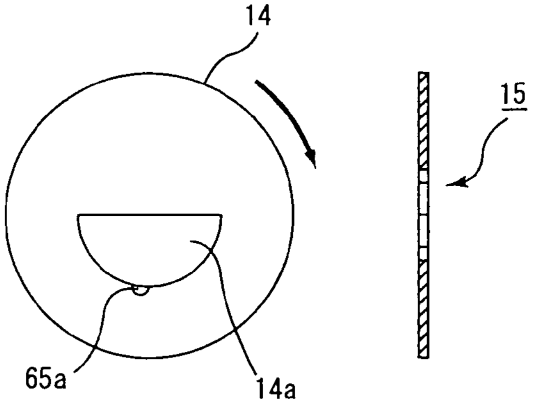
Figure 20C:
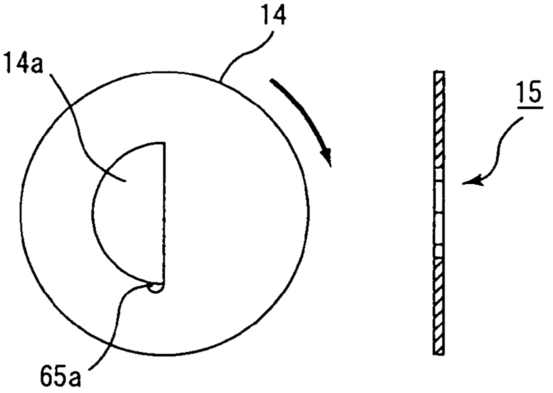

FIG. 20A shows a position of the meal plate 14*a* when the metal plate 14*a* starts being detected by the proximity sensor 65*a* (hereinafter also referred to as a position A). If the reel 14 rotates when the metal plate 14*a* is at the position A, the metal plate 14*a* moves to a position shown in FIG. 20B. FIG. 20B shows a position of the metal plate 14*a* when the metal plate 14*a* is being detected by the proximity sensor 65*a* (hereinafter also referred to as a position B). If the reel 14 rotates when the metal plate 14*a* is at the position B, the metal plate 14*a* moves to a position shown in FIG. 20C. FIG. 20C shows a position of the metal plate 14*a* when the metal plate 14*a* will no longer be detected by the proximity sensor 65*a* (hereinafter also referred to as a position C).

Figure 20D:
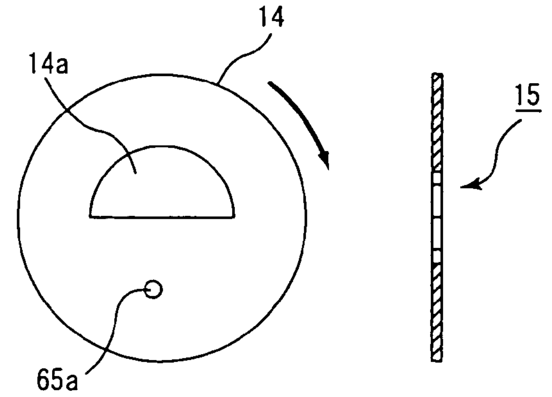

If the reel 14 rotates when the metal plate 14*a* is at the position C, the metal plate 14*a* moves to a position shown in FIG. 20D. FIG. 20D shows a position of the metal plate 14*a* when the metal plate 14*a* is not detected by the proximity sensor 65*a* (hereinafter also referred to as a position D). If the reel 14 further rotates, a position of the metal plate 14*a* returns to the position A. As described above, together with the rotating of the reel 14, the metal plate 14*a* changes its position in the order from the position A, to the position B, to the position C, to the position D, to the position A and so forth.

The proximity sensor 65*a* constitutes an index detecting circuit 65 (see FIG. 3). When it is referred to as "High" at a state where the proximity sensor 65*a* detects the metal plate 14*a*, and as "Low" at a state where the proximity sensor 65*a* does not detect the metal plate 14*a*, a state of the index detecting circuit 65 is "High" during the period when the metal plate 14*a* moves from the position A to the position B and to the position C, and a state of the index detecting circuit 65 is "Low" during the period when the metal plate 14*a* moves from the position C to the position D and to the position A. The sub CPU 61 assigns a rise from "Low" to "High" as an index (origin) 1 and a fall from "High" to "Low" as an index (origin) 2 to thereby recognize the rotating position of the reel 14.

The main CPU 40, after transmitting in step 40 a start signal to the sub CPU 61, executes representation to be executed while the reels are rotating (step S41). The process is a processing which conducts display of an image on the lower image display panel 16 and output of a sound from the speaker 29 over a period (for example, 3 seconds) determined according to a result and the like of the lottery processing (step S13 in FIG. 14).

Then, the main CPU 40 determines whether it is the timing at which a command is to be issued so as to stop the rotating of the reel 14, or not (step S42).

The timing at which a command is issued so as to stop rotation of a reel 14 is a timing before the time when the representation to be executed while the reels are rotating is terminated, which is an interval having the minimum time necessary for stopping the rotating of the reel 14. Note that the minimum time necessary for stopping the rotating of the reel 14 is determined in advance.

If it is determined in step S42 that it is not the timing at which the command to stop the rotating of the reel 14 is to be issued, the process returns to the processing in step S42 and the representation to be executed while the reels are rotating continues to be conducted. On the other hand, if it is determined in step S42 that it is the timing at which the command to stop the rotating of the reel 14 is to be issued, the main CPU 41 transmits to the sub CPU 61 a code No. of the reel which is stored in RAM 43 (step S43). When the sub CPU 61 receives a code No. of the reel from the main CPU 41, the code No. is converted to a stopping position of the reel (the number of steps) from an index, based on a correspondence table between the number or steps and the code Nos. stored in ROM (not shown in the figure) included in the sub CPU 61 (step S52).

Figures 21, 22:
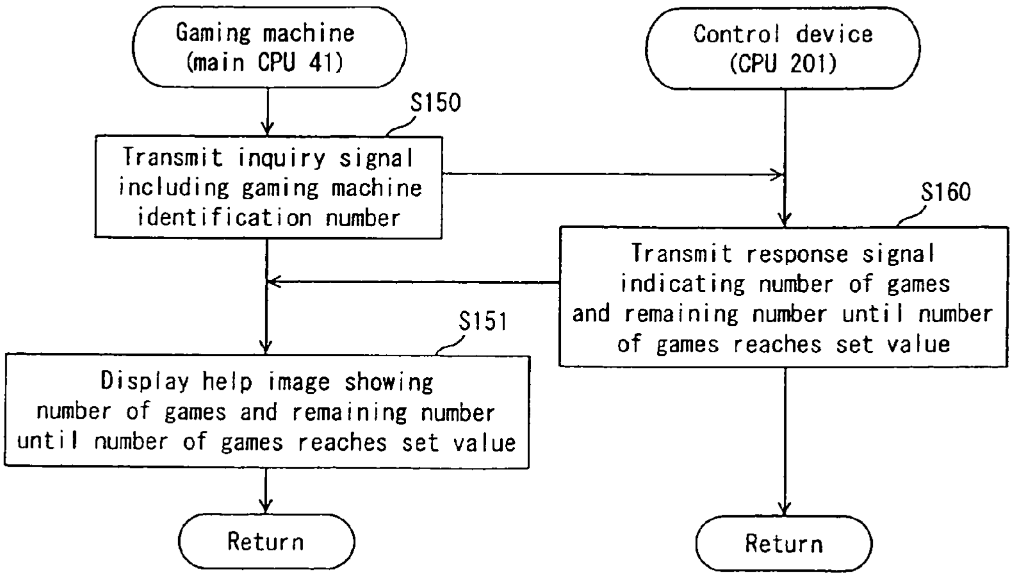
FIG. 21 is a schematic diagram showing a correspondence table between the number of steps and the code No.
FIG. 22 is a flowchart showing a subroutine of a help image display processing.

FIG. 21 is a schematic diagram showing a correspondence table between the number of steps and the code No. Each of the code Nos. are related to an index and the number of steps.

Each code No. corresponds to the symbols depicted on the circumferential surfaces of the reels 14 (see FIG. 3) and symbols of code Nos. "00" to "10" correspond to the index 1. Moreover, symbols of code Nos. "11" to "21" correspond to the index 2. The number of steps in the correspondence table shown in FIG. 21 is the number of steps with the index 1 as a reference. For example, if a code No. is "08", a stopping position of the reel is at 145 steps from the index 1. If a code No. is "12", as topping position of the reel is at 218 steps from the index 1.

Then, the sub CPU 61 executes a reel stopping processing (step S53). In the processing, the sub CPU 61 detects a rise in the index detecting circuit 65 from "Low" to "High" (the index 1) on each of the reels 14, and supplies to the motor driving circuit 65 pulses corresponding to the number of steps which were converted in step S52 from a code No. at a timing at which the index 1 is detected, and supply of pulses is ceased thereafter.

For example, when, in step S52, the stopping positions of the reels are determined to be 145 steps from the index 1, the sub CPU 61 supplies 145 pulses to the motor driving circuit 65 at a timing at which the index 1 is detected, and the supply of pulses is terminated thereafter. Furthermore, when, in step S52, the stopping positions of the reels are determined to be 218 steps from the index 1, the sub CPU 61 supplies 218 pulses to the motor driving circuit 65 at a timing at which the index 1 is detected. As a result, the reels 14 stop at the code No. determined in step 32 of FIG. 17 and the combination of symbols corresponding to the winning combination determined in step S32 of FIG. 17 is stop displayed on the winning line L. On the other hand, the main CPU 41 terminates the representation to be executed while the reels are rotating. After the processing in steps S44 and S53 are over, the present reel rotating control processing is completed.

Moreover, when an index corresponding to the code No. transmitted in step S43 is different from an index detected by the index detecting circuit 65 when the rotating of the reels 14 stop, this means that an out-of-order state occurred on the reels 14; therefore, the main CPU 41 conducts a processing for displaying an error message on the lower image display panel 16 to temporarily stop a game.

For example, in a case where, even though a processing for stopping the reel 14L was executed at the code No. 12 corresponding to the index 2, the index 1 is detected by the index detecting circuit 65 when the rotating of the reel 14L stops, the game is temporarily stopped.

FIG. 22 is a flowchart showing a help image display processing to be performed as an intervention process when the player touches a predetermined portion of the touch panel 69 corresponding to the display region of the image 90' (see FIG. 13) displayed on the lower image display panel 16 during execution of the subroutine shown in FIG. 14. This is a processing to be performed between the main CPU 41 of the gaming machine 10 and the CPU 201 of the control device 200.

First, the main CPU 41 transmits an inquiry signal including a gaming machine identification number to the control device 200 through the communication line 101 by means of the communication interface 44 (step S150).

On the other hand, upon receipt of the inquiry signal from the gaming machine 10 through the communication line 101 by means of the communication interface 204, the CPU 201 of the control device 200 transmits a response signal to the gaming machine 10 through the communication line 101 by means of the communication interface 204, the response signal indicating the number of games stored in the hard disc drive 205 corresponded to the gaming machine identification number which is included in the inquiry signal and the remaining number of games until the number of games reaches a set value (step S160).

Upon receipt of the response signal from the control device 200 through the communication line 101 by means of the communication interface 44, the main CPU 41 of the gaming machine 10 performs the processing of displaying a help image based upon the number of games and the remaining number of games which are indicated by the response signal (step S151).

In this processing, the main CPU 41 stores in the RAM 43 the number of games and the remaining number of games which are indicated by the response signal. Subsequently, the main CPU 41 transmits a help image depiction command to the graphic board 68 based upon the number of games and the remaining number of games. The graphic board 68 performs the processing of displaying images on the upper image display panel 33 and the lower image display panel 16 based upon the depiction command.

As a result, images as shown in FIG. 23 are for example displayed on the upper image display panel 33 and the lower image display panel 16.

FIG. 23 is a figure showing one example of images displayed on the upper image display panel and the lower image display panel in the with-insurance mode.

An image 95 showing an upward-pointing indicator and "Look Up" is displayed on the lower part of the lower image display panel 16. The image 95 is an image intended to prompt the player to look at the upper image display panel 33.

The help image 93 is displayed on the upper side of the upper image display panel 33. The help image 93 is the same image as shown in FIG. 12. An image 94 showing "INSURANCE STATUS, Current number of games: 500 games, Remaining number of games: 100 games" is displayed on the lower side of the help image 93. The image 94 is an image showing the number of games and the remaining number of games until the number of games reaches a set value. Namely, "Current number of games: 500 games" shows the number of games, while "Remaining number of games: 100 games" shows the remaining number.

It is to be noted that the images 94, 95 and the help image 93 which are shown in FIG. 23 disappear when a predetermined period of time (for example, ten seconds) elapses from the display of those images.

After completion of the processing of step S151, the present processing is completed.

Figure 24:
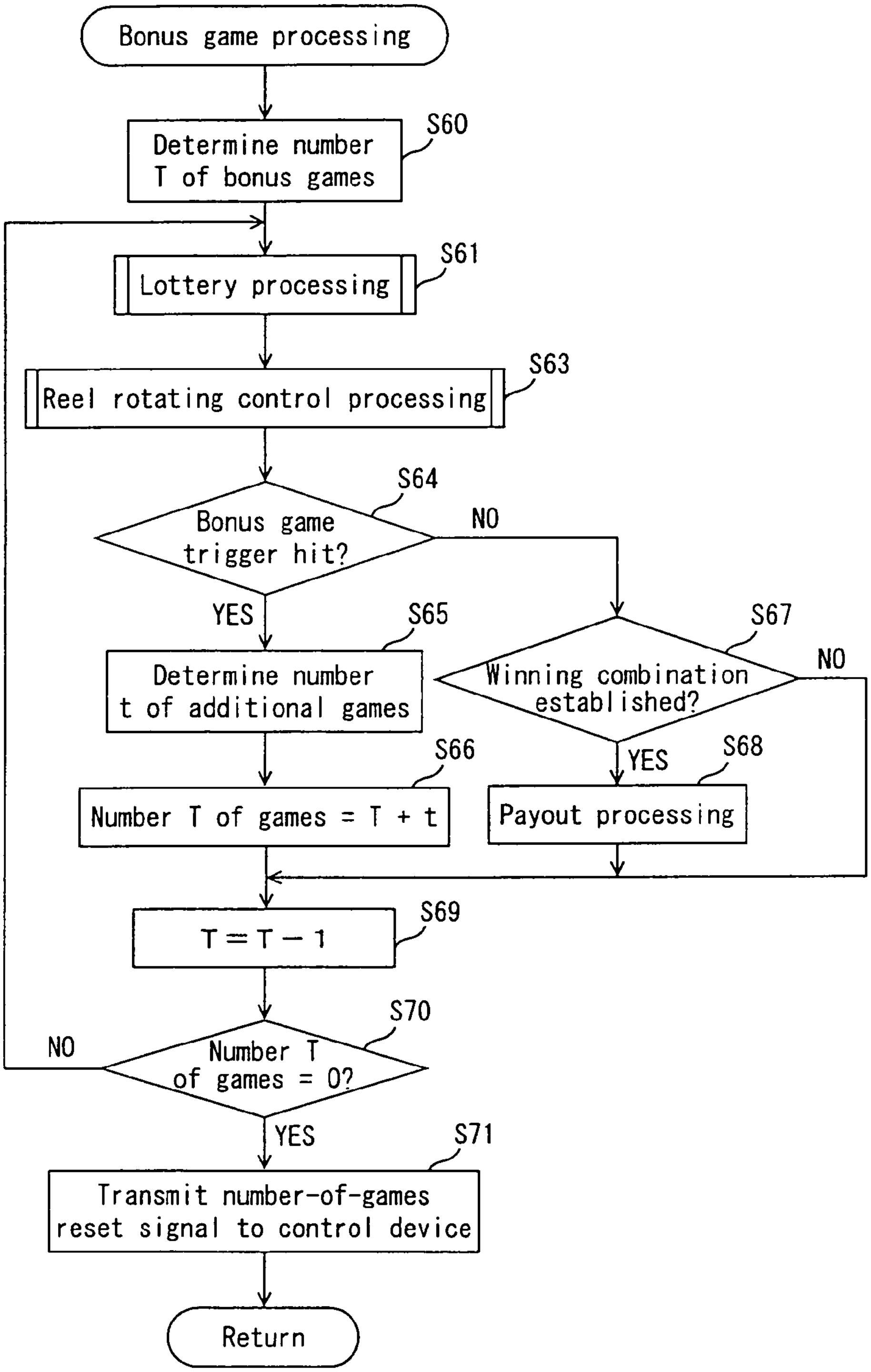
FIG. 24 is flowchart showing a subroutine of a bonus game processing.

FIG. 24 is a flowchart showing a subroutine of a bonus game processing called and executed in step S16 of the subroutine shown in FIG. 14. In the bonus game processing, firstly, the main CPU 41 determines a number T of bonus games from 10 to 25 games, based on a random number value obtained by executing a random number generation program included in a lottery program stored in RAM 43 (step S60). The main CPU 41 stores as data into RAM 43 the number of games of the determined bonus games.

Next, the main CPU 41 conducts a lottery processing (step S61) and a reel rotating control processing (step S63). The processing in step S61 is a processing almost the same as the processing described using FIG. 17. The processing in step S63 is a processing almost the same as the processing described using FIG. 19. Since descriptions of these processing have already been given, descriptions thereof are omitted herein.

Then, the main CPU 41 determines whether a bonus game trigger has been established or not, that is, whether three "APPLE" are stop displayed in the display windows 15 or not (step S64). If it is determined that the bonus game trigger has been established, the number t of additional games of the bonus game is determined in a lottery (step S65) and the determined number t of additional games is added to the number T of games of the bonus game (step S66). Thus, when a bonus game is hit during the bonus game, a remaining number of bonus games increases. More specifically, for example, in a case where a game state shifts to 20 bonus games for the first time, and hits 17 bonus games upon conducting 12 of the bonus games, another 25 bonus games (20 bonus games−12 bonus games+17 bonus games) are to be conducted.

If a bonus game trigger has not been established, the main CPU 41 determines whether a winning combination has been established or not (step S67). If it is determined that the winning combination has been established, the main CPU 41 conducts payout of coins corresponding to the number of coin-in and the winning combination (step S68). Since the processing is similar to the processing in step S18 and description thereof has already been given, the description of the present processing is omitted herein.

In a case where the processing in step S66 or S68 has been executed, or if it is determined in step S67 that any winning combination has not been established (if it is determined that a failure has occurred), the main CPU 41 reads the number T of bonus games stored in RAM 43, and one bonus game is subtracted from the read number T of bonus games. The number T of bonus games after the subtraction is again stored into RAM 43 (step S69).

Then, the main CPU 41 determines whether the number T of bonus games reaches the number of games determined in step S60 or not (step S70). More specifically, it is determined whether the number T of games stored in RAM 43 has become 0 or not, and if the number T of games is not 0, that is, if it is determined that the number of bonus games played does not reach the number of games which were determined in step S60, the process returns to step S61 and the above-mentioned processing is repeated. On the other hand, if the number T of games is 0, that is, if it is determined that the number T of games has reached the number of games which were determined in step S60, a number-of-games reset signal is transmitted to the control device 200 (step S71), and the present subroutine is completed thereafter. The number-of-games reset signal includes the gaming machine identification information of the gaming machine 10, and CPU 201 of the control device 200, when receiving the number-of-games reset signal, resets to 0 the number of games of which is stored in the hard disc drive 205 by being made to correspond to the gaming machine identification information included in the number-of-games reset signal.

Figure 25:
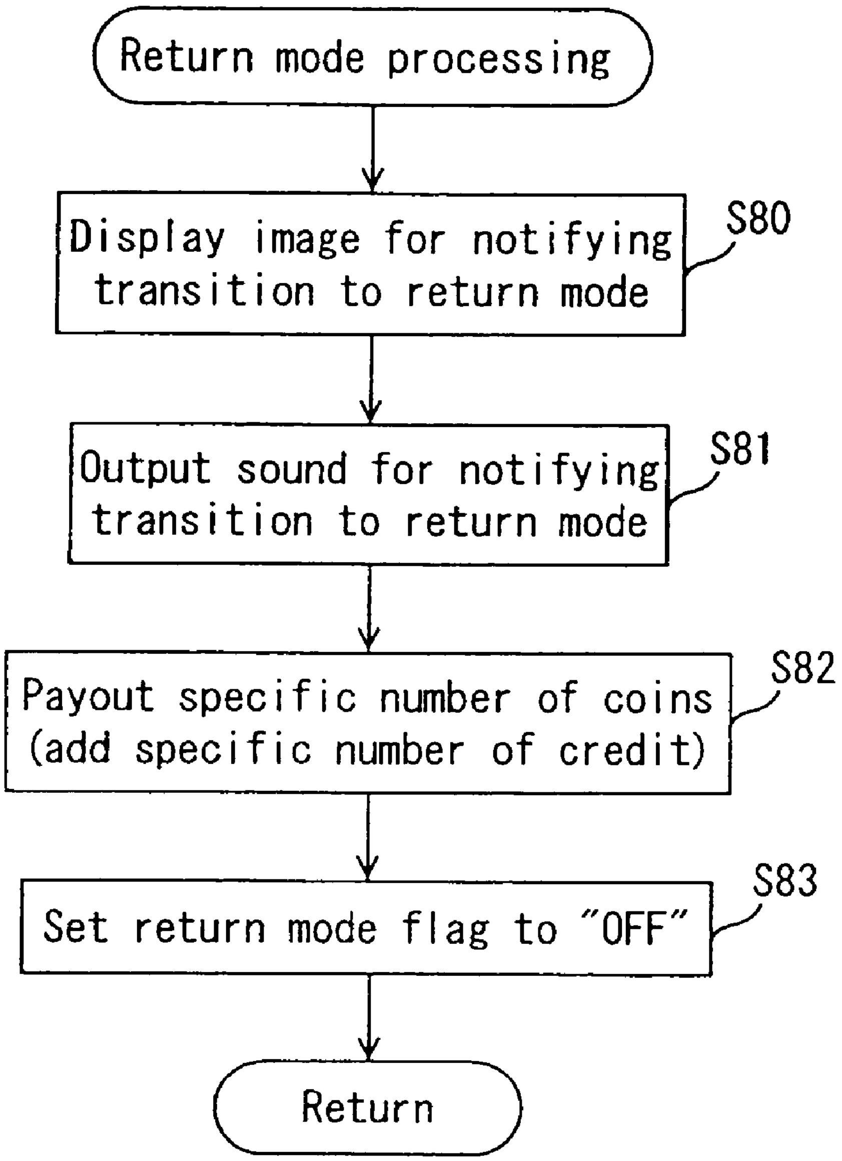
FIG. 25 is a flowchart showing a subroutine of a return mode processing.

FIG. 25 is a flowchart showing a subroutine of a return mode processing called and executed in step S20 of the subroutine shown in FIG. 14.

First, the main CPU 41 extracts from the image data stored in the RAM 43 an image data for notifying the shift to the return mode, and performs the processing of displaying the image on the lower image display panel 16 based upon the image data (step S80). Image data for notifying the transition to the return mode is read from the memory card 53 and included in a game program stored into RAM 43.

The main CPU 41 transmits to the graphic board 68 depiction command of an image for notifying transition to the return mode. On the graphic board 68, based upon the depiction command, the VDP extracts image data from the RAM 43 to be developed in a video RAM, and produces one frame of image data to be outputted to the upper image display panel 33 and the lower image display panel 16. As a result, images as shown in FIG. 26 are displayed for example on the upper image display panel 33 and the lower image display panel 16.

Figure 26:
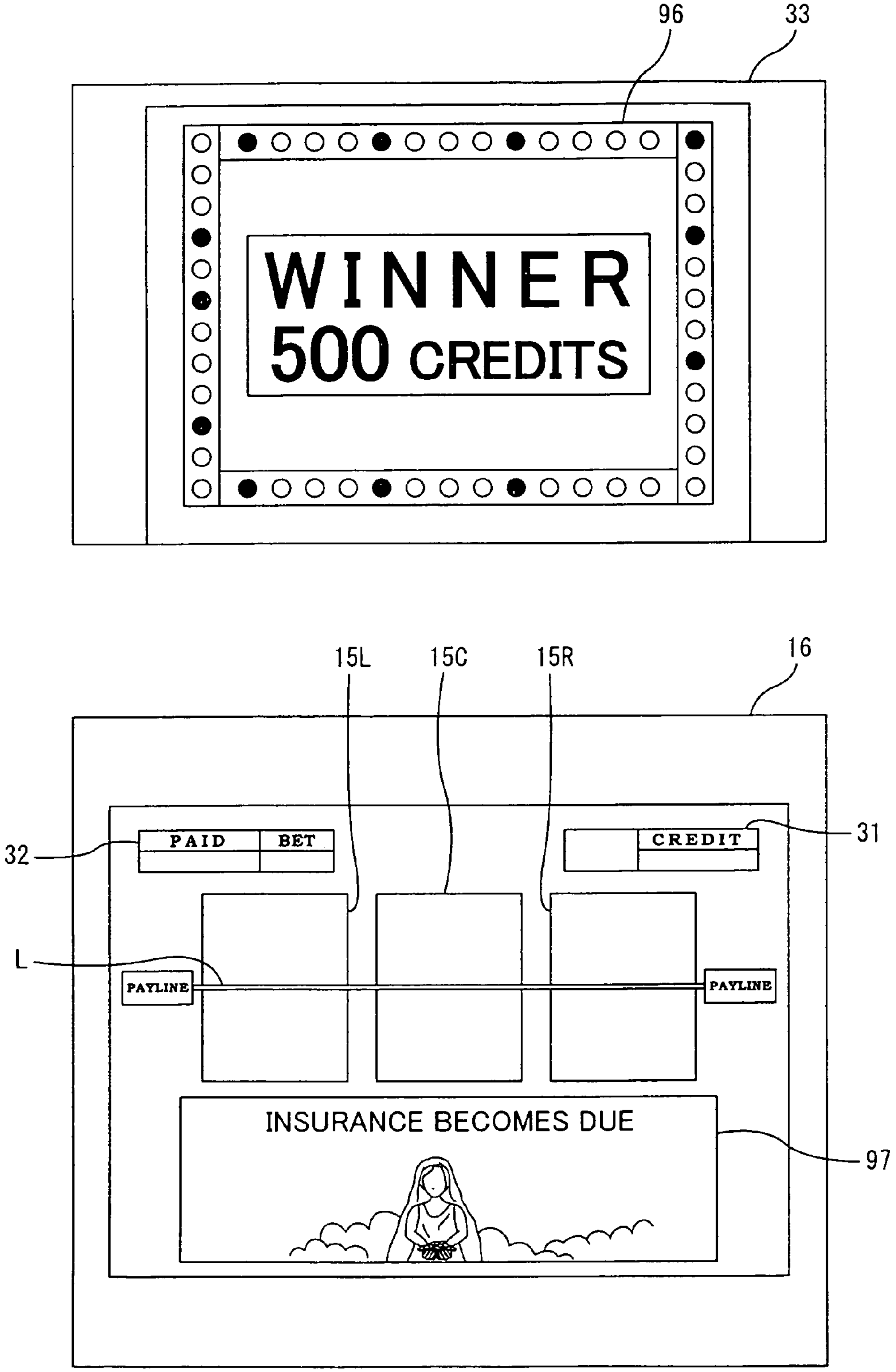
FIG. 26 is a figure showing one example of images displayed on the upper image display panel and the lower image display panel when the game state shifts to the return mode (when the second special game state is generated)

FIG. 26 is a figure showing one example of images displayed on the upper image display panel and the lower image display panel during transition to the return mode (during generation of the second special game state).

An image 96 showing "WINNER 500 CREDITS" is displayed on the upper image display panel 33. Furthermore, a representation image 97 is displayed on a lower part of the lower image display panel 16. The representation image 97 is an image showing a message "INSURANCE BECOMES DUE" and a goddess who pays out coins.

Next, the main CPU 41 extracts from sound data stored in the RAM 43 sound data for notifying transition to the return mode, and performs the processing of outputting sound from the speaker 29 based upon the extracted sound data (step S81). The sound data for notifying transition to the return mode is included in the game program read from the memory card 53 and stored in the RAM 43.

The main CPU 41 extracts sound data for notifying transition to the return mode, converts the sound data into a sound signal, and supplies the speaker 29 with the converted sound signal. As a result, the sound for notifying transition to the return mode is output from the speaker 29.

Next, the main CPU 41 performs the processing of paying out a specific number of coins, or the processing of adding a specific number of credits (step S82).

In the case of performing the processing of adding a specific number of credits, the main CPU 41 performs the processing of adding a specific number (500 in the present embodiment) of credits stored in the RAM 43. On the other hand, in the case of paying out the coin, the main CPU 41 transmits a control signal to the hopper 66, to pay out a specific number (500 in the present embodiment) of coins. At this time, the coin detecting section 67 counts the number of coin-outs from the hopper 66, and when the count reaches a designated number, transmits a payout completion signal to the main CPU 41. The main CPU 41 thereby stops drive of the hopper 66, to complete the coin-out processing.

It is to be noted that the ticket 39 with a bar code may be issued in step S82. In such a case, the main CPU 41 supplies the ticket printer 35 with data such as a specific number of credits (500 credits in the present embodiment), a date, time, an identification number of the gaming machine 10 and of the like data, and the ticket printer 35 issues the ticket 39 with a bar code based upon the above-mentioned data.

After the processing of step S82, the main CPU 41 sets the return mode flag to "OFF" (step S83) to complete the present subroutine.

Figure 27:
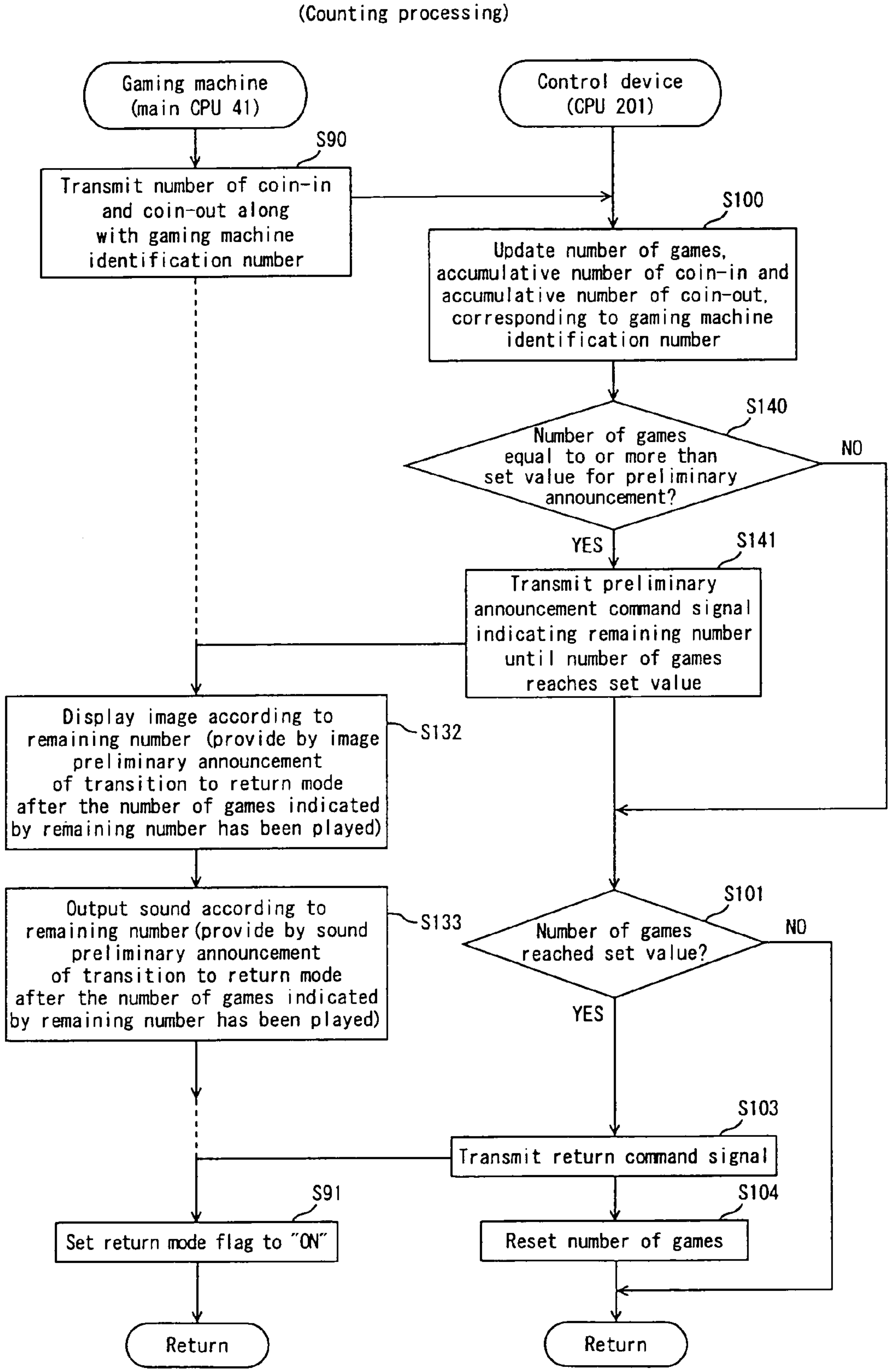
FIG. 27 is a flowchart showing a subroutine of a counting processing.

FIG. 27 is a flowchart showing a counting processing to be called and performed in step S22 of the subroutine shown in FIG. 14.

This is a processing to be performed between the main CPU 41 of the gaming machine 10 and the CPU 201 of the control device 200.

To begin with, the main CPU 41 transmits by the communication interface 44 the number of coin-in and the number of coin-out stored in RAM 43 together with the gaming machine identification number to the control device 200 through the communication line 101 (step S90). The number of coin-in and the number of coin-out transmitted to the control device 200 from the gaming machine 10 are those of the game concerned.

The processing in step S90 is a processing in which the main CPU 41 (processing device) transmits the identification information of the gaming machine 10 stored in the RAM 43 (storage device) to the control device 200 through the communication line 101, each time a game is played.

On the other hand, the CPU 201 of the control device 200, when receiving from the gaming machine 10 the number of coin-in, the number of coin-out and the gaming machine identification number through the communication line 101 by the communication interface 204, updates the number of games, the accumulative number of coin-in and the accumulative number of coin-out corresponding to the received gaming machine identification number (step S100), by choosing the data, which are made to correspond to each of the gaming machine identification numbers, of the number of games, the accumulative number of coin-in, the accumulative number of coin-out stored in the hard disc drive 205 (see FIG. 6).

Next, the CPU 201 determines whether or not the updated number of games is not smaller than a set value for preliminary announcement (step S140). The set value for preliminary announcement is a value (570 in the present embodiment) smaller than the set value, and previously stored as data in the hard disc drive 205.

In step S140, when determining that the updated number of games is not smaller than the set value for preliminary announcement, the CPU 201 transmits to the gaming machine 10 through the communication line by means of the communication interface 204, a command signal for preliminary announcement indicating the remaining number until the number of games reaches a set value (step S141).

Upon receipt of the command signal for preliminary announcement transmitted from the control device 200 in step S141, the main CPU 41 of the gaming machine 10 extracts from the image data stored in the RAM 43 image data according to the above-mentioned remaining number. Based upon the extracted image data, the main CPU 41 then performs the processing of displaying an image according to the remaining number on the upper image display panel 33 and the lower image display panel 16, to provide preliminary announcement that the game state will be shifted to the return mode after the displayed remaining number of games are played (step S132). The image data for providing preliminary announcement of transition to the return mode is included in the game program read from the memory card 53 and stored in the RAM 43. This game program includes, as image data for providing preliminary announcement of transition to the return mode, a plurality of kinds of image data corresponded to the remaining number.

Figure 29:
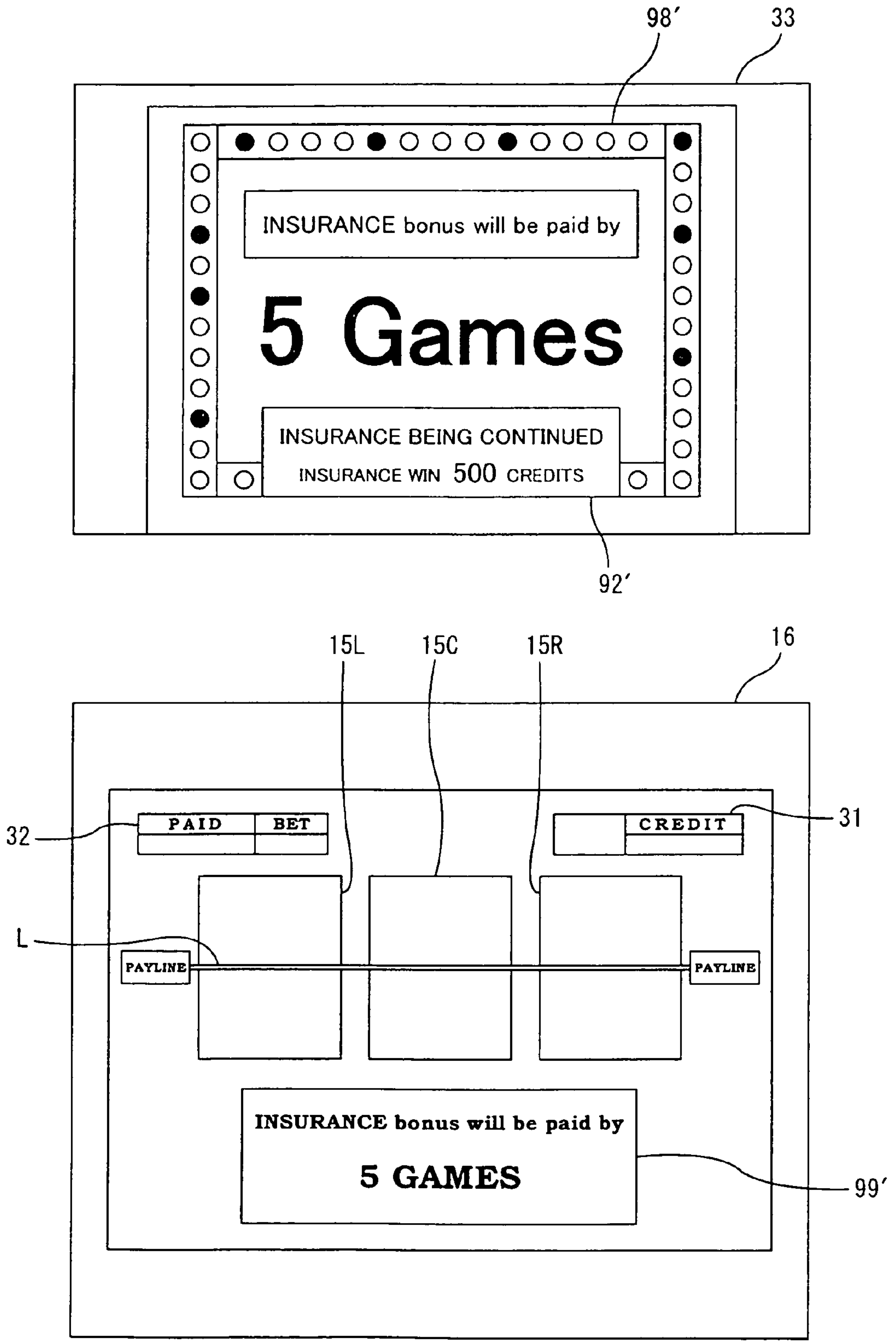
FIG. 29 is a figure showing one example of images displayed on the upper image display panel and the lower image display panel when five games are left to be played before the game state is shifted to the return mode.

The main CPU 41 determines images to be displayed on the upper image display panel 33 and the lower image display panel 16 based upon the remaining number. The main CPU 41 then transmits to the graphic board 68 a depiction command based upon the determination result. On the graphic board 68, the VDP extracts image data according to the remaining number from the RAM 43 to be developed in a video RAM based upon the depiction command, and produces one frame of image data to be outputted to the upper image display panel 33 and the lower image display panel 16. As a result, an image as shown in FIGS. 28 and 29 is for example displayed on the upper image display panel 33 and the lower image display panel 16.

FIG. 28 is a figure showing one example of images displayed on the upper image display panel and the lower image display panel when 30 games are left to be played until the game state shifts to the return mode.

The upper image display panel 33 displays a representation image 98 along with the image 92' (see FIG. 13). The representation image 98 is an image showing that 30 games are left to be played until the game state shifts to the return mode, and displayed on the whole area of the upper image display panel 33 except for the image 92'.

Also on the lower image display panel 16 displayed is an image 99 showing that 30 games are left to be played until the game state is shifted to the return mode.

FIG. 29 is a figure showing one example of images displayed on the upper image display panel and the lower image display panel when five games are left to be played until the game state shifts to the return mode.

The upper image display panel 33 displays a representation image 98' along with the image 92' (see FIG. 13). The representation image 98' is an image showing that five games are left to be played until the game state shifts to the return mode, and displayed on the whole area, except for the area corresponding to the image 92', of the upper image display panel 33. Also on the lower image display panel 16 displayed is an image 99' showing that five games are left to be played until the game state shifts to the return mode. As shown in FIGS. 28 and 29, display of the remaining number of games (remaining number) until the transition to the return mode allows providing to the player preliminary announcement that the game state will be shifted to the return mode in the near future. Hence, it is possible to prevent the player having consumed a large number of game media from losing interest in or concern on the game, and stopping the game.

Next, the main CPU 41 extracts sound data according to the remaining number from sound data stored in the RAM 43, and performs the processing of outputting sound from the speaker 29 based upon the extracted sound data to provide by sound preliminary announcement that the game state will be shifted to the return mode after the displayed remaining number of games are played (step S133). The sound data for providing preliminary announcement of transition to the return mode is included in the game program read from the memory card 53 and stored in the RAM 43. This game program includes, as sound data for providing preliminary announcement of transition to the return mode, a plurality of kinds of image data corresponded to the remaining number.

The main CPU 41 determines sound to be outputted from the speaker 29 based upon the remaining number. The main CPU 41 extracts sound data from the RAM 43 based upon the determination result, and converts the sound data to a sound signal to be supplied to the speaker 29. As a result, the sound for providing preliminary announcement that the game state will be shifted to the return mode after the displayed remaining number of games are played is output from the speaker 29.

On the other hand, after performing the processing of step S141, the CPU 201 of the control device determines whether or not the updated number of games has reached a set value (step S101). When determining that the updated number of games has reached the set value, the CPU 201 transmits a return command signal to the gaming machine 10 through the communication line 101 by means of the communication interface 204 (step S103). The CPU 201 thereafter sets to zero the number of games stored in the hard disc drive 205 corresponded to the gaming machine identification number of the gaming machine 10 (step S104).

The main CPU 41 of the gaming machine 10, when receiving the return command signal transmitted from the control device 200 in step S103, sets the return mode flag to the state "ON" (step S91). Thereafter, the present processing is terminated.

In the present embodiment, description has been given of a case where a game state shifts to the return mode when the number of games reaches a set value (see FIG. 27). The present invention is, however, not limited to this example. For example, in a case where the number of inserted game media for a game played by the player is at the upper limit value that can be accepted in one game when the number of games reaches the set value, the second special game state may be generated (the game state shifts to the return mode). This is because in such a case, a player can be urged to insert game media up to the upper limit and a facility such as a casino and the like can increase a profit.

Moreover, in a case where the second special game state is generated when the number of inserted game media is at the upper limit value, the second special game state may be generated not when the number of games reaches the set value, but when the number of inserted game media is at the upper limit value for a game played by a player when the number of games in which insertion of game media is conducted to the upper limit value reaches a set value. In such a case, it can be prevented from a small number of game media to be inserted in a game, thereby leading to a fact that the second special game state is generated by the spending of only a small number of game media in total.

As thus described, the gaming machine 10 according to the present embodiment is a gaming machine which comprises the main CPU 41 (processing device) and the RAM 43 (storage device), and the upper image display panel 33 and the lower image display panel 16; and connected with a control device which accumulatively counts the number of games played at each of a plurality of gaming machines 10, through a communication line, wherein the main CPU 41 performs: a processing of executing a lottery program stored in the RAM 43 to determine one winning combination selected from a plurality of winning combinations determined in advance (see FIG. 17); a processing of reading from the RAM 43 a program for generating a bonus game (first special game state) when the determined winning combination is a special winning combination, "bonus game trigger", and then executing the program (see FIG. 24); a processing of reading from the RAM 43 a program for shifting the game state from a without-insurance mode to a with-insurance mode on condition that a specific number of credits have been inserted, and then executing the program (see FIG. 10); a processing of transmitting identification information of the gaming machine 10 stored in the RAM 43 to the control device 200 through the communication line 101 every time a game is played after the game state has been shifted to the with-insurance mode (step S90 in FIG. 27); a processing of receiving a return command signal transmitted from the control device 200 when the number of games accumulatively counted with the control device 200 based upon the identification information of the gaming machine 10 reaches a set value (step S91 in FIG. 27); a processing of reading from the RAM 43 a program for shifting the game state to the return mode (generating a second special game state) based upon the command signal, and then executing the program (see FIG. 25); and a processing of reading from the RAM 43 a program for shifting the game state from the with-insurance mode to the without-insurance mode when the winning combination determined in the with-insurance mode is a special winning combination "bonus game trigger", and then executing the program (step S23 in FIG. 14).

According to the gaming machine 10, the game state is shifted from a without-insurance mode to a with-insurance mode on condition that a specific number of coins (credits) have been inserted. The game state is then shifted to a return mode upon receipt of the command signal that is transmitted from the control device 200, when the number of games, counted with the control device 200 after the game state has been shifted to the with-insurance mode, reaches a set value. Moreover, since a condition has been set for continuation of the with-insurance mode such that, when a winning combination determined in the with-insurance mode is a special winning combination "bonus game trigger", the game state is shifted from the with-insurance mode to the without-insurance mode so as to prevent the game state from being shifted to the return mode, it is possible to get the player interested in or concerned on the return mode. It is therefore possible to prevent the player having consumed a large number of game media from raising discomfort or distrust toward the game and from losing interest in or concern on the game.

A gaming machine 10 according to the present embodiment is connected to the control device 200 through the communication line 101 and the control device 200 conducts counting of the number of games in the gaming machine 10 and determines whether the game state is to be shifted to the return mode or not (whether the second special game state is to be generated or not). The gaming machine 10 is not required to use a network and may be standalone.

The standalone gaming machine 10 according to the present invention may include a gaming machine 10 comprising the main CPU 41 (processing device) and the RAM 43 (storage device), wherein the main CPU 41 performs: a processing of executing a lottery program stored in the RAM 43 to determine one winning combination selected from a plurality of winning combinations determined in advance; a processing of reading from the RAM 43 a program for generating a bonus game (first special game state) when the determined winning combination is a special winning combination, "bonus game trigger", and then executing the program; a processing of reading from the RAM 43 a program for shifting the game state from a without-insurance mode to a with-insurance mode on condition that a specific number of coins (credits) have been inserted, and then executing the program; a processing of accumulatively counting the number of games every time a game is played after the game state has been shifted to the with-insurance mode; a processing of determining whether or not the number of games has reached a set value; a processing of reading from the RAM 43 a program for shifting the game state to the return mode (generating a second special game state) when the number of games is determined to have reached the set value, and then executing the program; and a processing of reading from the RAM 43 a program for shifting the game state from the with-insurance mode to the without-insurance mode when a winning combination determined in the with-insurance mode is the special winning combination "bonus game trigger", and then executing the program.

While the gaming machine 10 according to the present embodiment shifts to the return mode (the second special game state is generated) when the number of games reaches a set value, the present invention is not limited to this example.

A gaming machine 10 of the present invention may shift to the return mode (generate the second special game state) when a payment balance in terms of coins is equal to or less than a set value.

Examples of the above-mentioned gaming machine 10 may include a gaming machine which comprises the main CPU 41 (processing device) and the RAM 43 (storage device), and connected through a communication line with a control device 200 which accumulatively counts a payment balance in terms of coins at each of a plurality of gaming machines 10, wherein the main CPU 41 performs: a processing of executing a lottery program stored in the RAM 43 to determine one winning combination selected from a plurality of winning combinations determined in advance; a processing of reading from the RAM 43 a program for generating a bonus game (first special game state) when the determined winning combination is a special winning combination, "bonus game trigger", and then executing the program; a processing of reading from the RAM 43 a program for shifting the game state from a without-insurance mode to a with-insurance mode on condition that a specific number of credits have been inserted, and then executing the program; a processing of transmitting through the communication line 101 to the control device 200 the numbers of coin-ins and coin-outs in the current game along with identification information of the gaming machine 10, which are stored in the RAM 43; a processing of receiving a return command signal transmitted from the control device 200 when the payment balance in terms of the coins, accumulatively counted with the control device 200 based upon the identification information of the gaming machine 10, becomes equal to or less than a set value; a processing of reading from RAM 43 a program for shifting the game state to the return mode (generating a second special game state) based upon the command signal, and then executing the program; and a processing of reading from the RAM 43 a program for shifting the game state from the with-insurance mode to the without-insurance mode when a winning combination determined in the with-insurance mode is the special winning combination "bonus game trigger", and then executing the program.

According to the gaming machine 10 as described above, the game state is shifted from a without-insurance mode to a with-insurance mode on condition that a specific number of coins (credits) have been inserted. The game state is then shifted to a return mode upon receipt of a command signal transmitted from the control device 200 when the payment balance in terms of the coins, counted with the control device 200 after the shift to the with-insurance mode, becomes equal to or less than a set value. Moreover, since a condition has been set for continuation of the with-insurance mode such that, when a winning combination determined in the with-insurance mode is a special winning combination "bonus game trigger", the game state is shifted from the with-insurance mode to the without-insurance mode so as to prevent the game state from being shifted to the return mode, it is possible to get the player interested in or concerned on the return mode. It is therefore possible to prevent the player having consumed a large number of coins from raising discomfort or distrust toward the game and from losing interest in or concern on the game.

The gaming machine 10 is connected through the communication line 101 to the control device 200 and the control device 200 counts payment balance in terms of coins in the gaming machine 10, and determines whether a game state is to be shifted to the return mode or not (whether the second special game state is to be generated or not) The gaming machine 10 is, however, not necessarily required to be those using a network and may be standalone.

Examples of the above-mentioned gaming machine 10 may include a gaming machine 10 comprising the main CPU 41 (processing device) and the RAM 43 (storage device), wherein the main CPU 41 performs: a processing of executing a lottery program stored in the RAM 43 to determine one winning combination selected from a plurality of winning combinations determined in advance; a processing of reading from the RAM 43 a program for generating a bonus game (first special game state) when the determined winning combination is a special winning combination, "bonus game trigger", and then executing the program; a processing of reading from the RAM 43 a program for shifting the game state from a without-insurance mode to a with-insurance mode on condition that a specific number of credits have been inserted, and then executing the program; a processing of accumulatively counting a payment balance in terms of the coins every time a game is played after the game mode has been shifted to the with-insurance mode; a processing of determining whether or not the payment balance in terms of the coins is equal to or less than a set value; a processing of reading from the RAM 43 a program for shifting the game state to the return mode (generating a second special game state) when the payment balance in terms of coins is determined to be equal to or less than the set value, and then executing the program; and a processing of reading from the RAM 43 a program for shifting the game state from the with-insurance mode to the without-insurance mode when a winning combination determined in the with-insurance mode is the special winning combination "bonus game trigger", and then executing the program.

In the present embodiment, the case of accumulatively counting the number of games in each gaming machine corresponded to the gaming machine identification information was described. However, the present invention is not limited to this example. In the present invention, for example, player identification information may be added with respect to each player, and predetermined variables (for example, the number of games, a payment balance in terms of game media) for each player, corresponded to the player identification information, may be accumulatively counted. In such a case, inputting the player identification information is requested at start of the game or at transition to the with-insurance mode, and a processing of returning to zero, at input of the player identification information, predetermined valuables having been counted to that point.

In such a case, since a return can be paid with greater certainty to the player having consumed a large number of game media, it is possible to further raise interest in or concern on the game of the player.

In the present embodiment, description has been given of a case where a game state shifts to the return mode when the return mode flag has been set to the state "ON", without other conditions being established thereafter. The present invention is, however, not limited to this example and, for example, a game state may shift to the return mode when a predetermined condition has been met after the return mode flag is set to the state "ON". In such a case, the predetermined condition for transition to the return mode is not particularly limited, and may include, for example, establishment of a bonus game trigger, stop display of a predetermined combination of symbols, and of the like conditions.

In the present embodiment, description has been given of a case where a game state shifts to the return mode when the return mode flag is set to the state "ON", regardless of the combination of symbols stop displayed thereafter. However, the present invention is not limited to this example. For example, a combination of symbols corresponding to the transition to the return mode may be set in advance and a game state may shift to the return mode after the symbols are stop displayed in that combination of symbols.

In the present embodiment, description has been given of a case where symbols are stop displayed (step S14 in FIG. 14), a processing is conducted based on the stop displayed combination of symbols (steps S15 to S20 in FIG. 14), and the number of games is counted (step S22 in FIG. 14) thereafter. In the present invention, however, no specific limitation is placed on a timing at which counting of the number of games is conducted. For example, the timing may be a timing at which BET of a coin is conducted (after step S10 or S11 in FIG. 14) or a timing at which the spin button is turned ON (after step S12 in FIG. 14). The number of games may be counted at a predetermined timing that is in the period from the time when display of a change in symbol is started, to the time when symbol sequences are stop displayed, and a processing based on the stop displayed combination of symbols has been conducted (for example, a timing at which symbol sequences are stop displayed). Note that a timing at which a payment balance in terms of game media can be the same as described above.

In the present invention, in a case where a special winning combination has been established in the period from the time when the number of games reaches a set value, to the time when the second special game state is generated, only the second special game state may be generated, or alternatively, either the first special game state or the second special game state may be generated depending on a game situation and the like.

An embodiment similar to the above-mentioned embodiment can also be adopted in a case where the second special game state is generated according to a payment balance in terms of game media. In other words, in a case where a special winning combination has been established in the period from the time when a payment balance in terms of game media is equal to or less than a set value, to the time when the second special game state is generated, only the first special game state may be generated, only the second special game state may be generated, or either the first special game state or the second special game state may be generated depending on a game situation and the like.

Although this will be a repetition, in the return mode as the second special game state, a return situation to a player may be simply as such that a predetermined number of game media is paid out when the number of games reaches a set value. It may alternatively be a situation that when the number of games reaches a set value, the return mode as the second special game state, allowing a player to have a privilege in a similar manner to the first special game state such as a free game, a second game, a mystery game and the like, can be set, and a predetermined number of game media is paid out by one of the above-mentioned game state.

In the aforementioned embodiment, both embodiments are exemplified. Both embodiments correspond to the second special game state in the present invention.

A timing at which a predetermined number of game media is paid out is not limited to such a timing at which one game is completed and symbol sequences are stop displayed as in the mystery game described above, and for example, game media may be immediately paid out when the number of games reaches a set value.

Moreover, a method for paying out a predetermined number of game media is also not particularly limited, and for example, coins may be actually paid out, the number of credits may be increased, or a ticket such as a ticket with a bar code may be issued.

However, in order to be able to discriminate and recognize whether a player is paid out by an ordinary game or a bonus game (the first special game state), or by the return mode (the second special game state), it is necessary to perform the following way. That is, in a case where coins are actually paid out in mystery bonus of the return mode (the second special game state), the timing for payout is required to be different from those of an ordinary game and bonus game (the first special game state). Moreover, it is required that payout in an ordinary game and a bonus game (the first special game state) is performed with actual coins and payout in the return mode (the second special game state) is performed with a ticket described above. With such an embodiment adopted, payout in an ordinary game and a bonus game (the first special game state), and payout in the return mode (the second special game state) can be discriminated from each other.

Although the embodiment according to the present invention has been described, the description presents only some of the specific examples, and is not intended to limit the present invention in any way and specific constructions of each means and the like can be properly changed in terms of design. Besides, the effects described in the embodiment of the present invention are only the most preferable effects generated from the present invention and effects to be caused by the present invention is not limited to those described in the embodiment of the present invention.

What is claimed as new and desired to be secured by Letters Patent of the United States is:

1. A gaming machine equipped with a processing device and a storage device, said processing device executing:

determining one winning combination selected from plural winning combinations determined in advance by executing a lottery program stored in said storage device;

reading from said storage device a first program for generating a first special game state that is a game state advantageous to a player when the determined winning combination is a special winning combination, and executing said first program;

reading from said storage device a second program for shifting the game state from a without-insurance mode to a with-insurance mode on condition that a specific number of game media have been inserted, and then executing said second program;

reading from said storage device a third program for generating a second special game state that is a game state advantageous to the player and is the same kind of game state as or a different kind of game state from said first special game state when a payment balance in terms of the game media, accumulatively counted every time a game is played after the game state has been shifted to said with-insurance mode, becomes equal to or less than a first predetermined value that is an object of comparison with said payment balance in terms of the game media, and then executing said third program; and reading from said storage device a fourth program for terminating said with-insurance mode and establishing said without-insurance mode in response to a payout rate of the game media in said with-insurance mode being determined to have reached a value equal to or more than a second predetermined value, the second predetermined value indicating a payout rate which is advantageous to the player, and then executing said fourth program, said fourth program further terminating said with-insurance mode and establishing said without-insurance mode in response to determining a winning combination in said with-insurance mode to be the special winning combination.

2. A gaming machine equipped with a processing device and a storage device, and connected through a communication line to a control device which counts a payment balance in terms of a game media accumulatively for every gaming machine of plural gaming machines, said processing device executing:

determining one winning combination selected from plural winning combinations determined in advance by executing a lottery program stored in said storage device;

reading from said storage device a first program for generating a first special game state that is a game state advantageous to a player when the determined winning combination is a special winning combination, and executing said first program;

reading from said storage device a second program for shifting the game state from a without-insurance mode to a with-insurance mode on condition that a specific number of game media have been inserted, and then executing said second program;

transmitting a number of game media inserted and paid out in a game played by the player together with an identification information on a gaming machine, which are stored in said storage device to said control device through said communication line every time a game is played after the game state has been shifted to said with-insurance mode;

receiving a command signal transmitted from said control device when said payment balance in terms of the game media counted accumulatively by said control device, based on said identification information on the gaming machine and said number of game media inserted and paid out in a game played by the player, is equal to or less than a first predetermined value;

reading from said storage device, based upon said command signal, a third program for generating a second special game state that is a game state advantageous to the player and is the same kind of game state as or a different kind of game state from said first special game state, and then executing said third program; and reading from said storage device a fourth program for terminating said with-insurance mode and establishing said without-insurance mode in response to a payout rate of the game media in the with-insurance mode being determined to have reached a value equal to or more than a second predetermined value, the second predetermined value indicating a payout rate which is advantageous to the player, and then executing said fourth program, said fourth program further terminating said with-insurance mode and establishing said without-insurance mode in response to determining a winning combination in said with-insurance mode to be the special winning combination.

3. A gaming machine equipped with a processing device and a storage device, said processing device executing:

determining one winning combination selected from plural winning combinations determined in advance by executing a lottery program stored in said storage device;

reading from said storage device a first program for generating a first special game state that is a game state advantageous to a player when the determined winning combination is a special winning combination, and executing said first program;

reading from said storage device a second program for shifting the game state from a without-insurance mode to a with-insurance mode on condition that a specific number of game media have been inserted, and then executing said second program;

counting accumulatively a payment balance in terms of the game media every time a game is played after the game state has been shifted to said with-insurance mode;

determining whether or not the payment balance in terms of the game media is equal to or less than a first predetermined value;

reading from said storage device a third program for generating a second special game state that is a game state advantageous to the player and is the same kind of game state as or a different kind of game state from said first special game state, when the payment balance in terms of the game media is determined to be equal to or less than said first predetermined value, and then executing said third program; and reading from said storage device a fourth program for terminating said with-insurance mode and establishing said without-insurance mode in response to a payout rate of the game media in said with-insurance mode being determined to have reached a value equal to or more than a second predetermined value, the second predetermined value indicating a payout rate which is advantageous to the player, and then executing said fourth program, said fourth program further terminating said with-insurance mode and establishing said without-insurance mode in response to determining a winning combination in said with-insurance mode to be the special winning combination.

4. The gaming machine according to claim 1, wherein the fourth program establishes said without-insurance mode when the payment balance in terms of the game media in the with-insurance mode reaches a value equal to or more than a third predetermined value.

5. The gaming machine according to claim 2, wherein the fourth program establishes said without-insurance mode when the payment balance in terms of the game media in the with-insurance mode reaches a value equal to or more than a third predetermined value.

6. The gaming machine according to claim 3, wherein the fourth program establishes said without-insurance mode when the payment balance in terms of the game media in the with-insurance mode reaches a value equal to or more than a third predetermined value.

7. The gaming machine according to claim 1, wherein the fourth program establishes said without-insurance mode when a winning combination determined in the with-insurance mode is a non-special winning combination, and the non-special winning combination does not generate a game state advantageous to a player.

8. The gaming machine according to claim 2, wherein the fourth program establishes said without-insurance mode when a winning combination determined in the with-insurance mode is a non-special winning combination, and the non-special winning combination does not generate a game state advantageous to a player.

9. The gaming machine according to claim 3, wherein the fourth program establishes said without-insurance mode when a winning combination determined in the with-insurance mode is a non-special winning combination, and the non-special winning combination does not generate a game state advantageous to a player.

10. The gaming machine according to claim 1, wherein the fourth program establishes said without-insurance mode independent of an insurance payment operation, independent of a predetermined winning combination, and regardless of whether said payment balance reaches said set value.

11. The gaming machine according to claim 2, wherein the fourth program establishes said without-insurance mode independent of an insurance payment operation, independent of a predetermined winning combination, and regardless of whether said payment balance reaches said set value.

12. The gaming machine according to claim 3, wherein the fourth program establishes said without-insurance mode independent of an insurance payment operation, independent of a predetermined winning combination, and regardless of whether the payment balance reaches said set value.

13. The gaming machine according to claim 1, wherein the counting of the payment balance in terms of the game media starts in response to the game state being shifted to said with-insurance mode.

14. The gaming machine according to claim 2, wherein the counting of the payment balance in terms of the game media starts in response to the game state being shifted to said with-insurance mode.

15. The gaming machine according to claim 3, wherein the counting of the payment balance in terms of the game media starts in response to the game state being shifted to said with-insurance mode.

* * * * *